United States Patent
Lee et al.

(10) Patent No.: US 11,651,638 B2
(45) Date of Patent: May 16, 2023

(54) ACCESS CONTROL SYSTEM AND ACCESS CONTROL METHOD USING THE SAME

(71) Applicant: SUPREMA INC., Seongnam-si (KR)

(72) Inventors: Seong Jik Lee, Seoul (KR); Dong Mok Shin, Seongnam-si (KR); Seong Bin Choi, Seongnam-si (KR); Jae Won Lee, Seongnam-si (KR)

(73) Assignee: SUPREMA INC., Seongnam-si (KR)

( * ) Notice: Subject to any disclaimer, the term of this patent is extended or adjusted under 35 U.S.C. 154(b) by 0 days.

(21) Appl. No.: 17/862,379

(22) Filed: Jul. 11, 2022

(65) Prior Publication Data

US 2022/0351561 A1 Nov. 3, 2022

Related U.S. Application Data

(63) Continuation of application No. 17/039,392, filed on Sep. 30, 2020, now Pat. No. 11,386,733, which is a
(Continued)

(30) Foreign Application Priority Data

Sep. 5, 2017 (KR) .................. 10-2017-0113565
Sep. 5, 2017 (KR) .................. 10-2017-0113566
(Continued)

(51) Int. Cl.
*G07C 9/22* (2020.01)
*G07C 9/00* (2020.01)
(Continued)

(52) U.S. Cl.
CPC ........... *G07C 9/22* (2020.01); *G07C 9/00309* (2013.01); *G07C 9/00571* (2013.01);
(Continued)

(58) Field of Classification Search
None
See application file for complete search history.

(56) References Cited

U.S. PATENT DOCUMENTS 6,167,464 A * 12/2000 Kretschmann ....... G05B 19/042
710/73
8,120,459 B2 * 2/2012 Kwak .................... H04L 12/64
340/5.2
(Continued)

FOREIGN PATENT DOCUMENTS

JP 2004-287991 A 10/2004
JP 2006-501536 A 1/2006
(Continued)

OTHER PUBLICATIONS

Euopean Office Action dated Apr. 9, 2021 as received in application No. 18852901.
(Continued)

*Primary Examiner* — Muhammad Adnan
(74) *Attorney, Agent, or Firm* — Maschoff Brennan

(57) ABSTRACT

Disclosed herein are an access control system and an access control method using the same. The access control method in which a door operating device determines whether to open a door on the basis of an authentication token acquired from a user terminal without intervention of an authentication server includes obtaining the authentication token from the user terminal; determining whether the user have authorization for accessing the door based on a authentication information included in the authentication token; controlling the door to be opened in case of determined that the user have authorization for accessing the door.

15 Claims, 25 Drawing Sheets

Related U.S. Application Data continuation of application No. 16/405,878, filed on May 7, 2019, now abandoned, which is a continuation of application No. 15/845,929, filed on Dec. 18, 2017, now Pat. No. 10,332,325.

(30) Foreign Application Priority Data

Sep. 5, 2017 (KR) ........................ 10-2017-0113567
Sep. 5, 2017 (KR) ........................ 10-2017-0113568

(51) Int. Cl.
*H04W 12/06* (2021.01)
*H04L 9/40* (2022.01)
*H04W 4/80* (2018.01)

(52) U.S. Cl.
CPC ......... *H04L 63/0853* (2013.01); *H04W 12/06* (2013.01); *G07C 2009/00769* (2013.01); *G07C 2209/62* (2013.01); *H04W 4/80* (2018.02)

(56) References Cited

U.S. PATENT DOCUMENTS

| | | | | |
|---|---|---|---|---|
| 8,347,104 | B2* | 1/2013 | Pathiyal | H04W 12/08 713/185 |
| 8,595,808 | B2* | 11/2013 | Langley | H04L 63/1483 726/7 |
| 8,645,569 | B2* | 2/2014 | Farchmin | H04L 47/70 709/245 |
| 9,007,173 | B2* | 4/2015 | McIntyre | G07C 9/00904 343/893 |
| 9,485,607 | B2* | 11/2016 | Aarnio | H04W 4/80 |
| 9,591,453 | B1* | 3/2017 | Hyde | G01S 5/0231 |
| 9,762,575 | B2* | 9/2017 | Je | H04W 12/02 |
| 9,775,038 | B2* | 9/2017 | Ko | H04W 12/08 |
| 9,801,065 | B2* | 10/2017 | Kelts | H04L 67/04 |
| 9,832,314 | B2* | 11/2017 | Shanmugam | H04W 12/068 |
| 9,838,145 | B2* | 12/2017 | Tawfiq Moshtaha | H04W 12/068 |
| 9,917,653 | B2* | 3/2018 | Kim | H04W 48/20 |
| 9,990,787 | B2* | 6/2018 | Capaldi-Tallon | G06K 19/06037 |
| 10,051,097 | B2* | 8/2018 | Bowers | H04W 12/084 |
| 10,080,136 | B2* | 9/2018 | Lacey | H04W 8/24 |
| 10,127,750 | B2 | 11/2018 | Cordiner | |
| 10,135,629 | B2* | 11/2018 | Browne, Jr. | H04L 12/2807 |
| 10,146,933 | B1* | 12/2018 | Schoenbrun | H04L 63/083 |
| 10,147,254 | B1* | 12/2018 | Shen | G07C 9/00309 |
| 10,244,086 | B2* | 3/2019 | Newman, Jr. | H04L 12/2803 |
| 10,332,325 | B2* | 6/2019 | Lee | G07C 9/00309 |
| 10,403,063 | B2* | 9/2019 | Drako | H04L 67/10 |
| 10,515,343 | B1* | 12/2019 | Kim | H04L 63/0876 |
| 10,573,106 | B1* | 2/2020 | Brady | G06V 40/1365 |
| 10,601,832 | B1* | 3/2020 | Pajjuri | H04L 63/10 |
| 10,621,328 | B2* | 4/2020 | Griffin | G09C 5/00 |
| 10,755,508 | B2* | 8/2020 | Ghorpade | G07C 9/00563 |
| 10,839,628 | B2* | 11/2020 | Berg | G07C 9/23 |
| 2004/0203874 | A1* | 10/2004 | Brandt | G06Q 10/025 455/422.1 |
| 2006/0129640 | A1* | 6/2006 | Farchmin | G05B 19/4188 700/95 |
| 2007/0096867 | A1* | 5/2007 | Denison | G06F 21/76 340/5.23 |
| 2007/0296545 | A1* | 12/2007 | Clare | G07C 9/00571 340/5.64 |
| 2008/0191009 | A1* | 8/2008 | Gressel | H04W 4/021 235/382 |
| 2009/0079537 | A1* | 3/2009 | Seitz | G05B 19/409 340/5.2 |
| 2013/0027177 | A1* | 1/2013 | Denison | G07F 9/001 340/5.23 |
| 2013/0234528 | A1* | 9/2013 | Kargl | H02J 50/80 307/104 |
| 2013/0285793 | A1 | 10/2013 | Sadighi et al. | |
| 2013/0335193 | A1* | 12/2013 | Hanson | G07C 9/00174 340/5.61 |
| 2014/0074696 | A1* | 3/2014 | Glaser | G06F 21/32 726/19 |
| 2014/0091903 | A1* | 4/2014 | Birkel | B60R 25/241 340/5.64 |
| 2014/0128032 | A1* | 5/2014 | Muthukumar | H04W 52/0254 455/412.2 |
| 2014/0162598 | A1* | 6/2014 | Villa-Real | H04M 1/66 455/411 |
| 2014/0232524 | A1 | 8/2014 | Nakai et al. | |
| 2014/0277805 | A1* | 9/2014 | Browne, Jr. | H04W 4/70 315/291 |
| 2014/0292481 | A1* | 10/2014 | Dumas | G07C 9/00174 340/5.61 |
| 2014/0320259 | A1* | 10/2014 | Marsden | G07C 9/37 340/5.52 |
| 2014/0365773 | A1* | 12/2014 | Gerhardt | H04M 1/72415 713/168 |
| 2016/0019735 | A1* | 1/2016 | Myers | G07C 9/27 340/5.61 |
| 2016/0049826 | A1* | 2/2016 | Lee | H02J 50/40 320/108 |
| 2016/0343185 | A1* | 11/2016 | Dumas | G07C 9/00309 |
| 2016/0359366 | A1* | 12/2016 | Holmstroem | H04B 10/808 |
| 2016/0359629 | A1* | 12/2016 | Nadathur | H04L 9/006 |
| 2017/0098335 | A1* | 4/2017 | Payack, Jr. | G07C 9/20 |
| 2017/0127222 | A1* | 5/2017 | Lang | H04W 52/30 |
| 2017/0132861 | A1* | 5/2017 | Ho | G07C 9/00896 |
| 2017/0154483 | A1 | 6/2017 | Cordiner | |
| 2018/0108192 | A1* | 4/2018 | Ho | G07C 9/253 |
| 2018/0122219 | A1* | 5/2018 | Caterino | H04L 9/3226 |
| 2018/0220291 | A1* | 8/2018 | Fares | H04W 12/082 |
| 2018/0262891 | A1* | 9/2018 | Wu | H04W 12/065 |
| 2021/0350639 | A1* | 11/2021 | Sabripour | H04L 63/0861 |

FOREIGN PATENT DOCUMENTS

| | | |
|---|---|---|
| JP | 3834056 B | 3/2007 |
| JP | 2007-132031 A | 5/2007 |
| JP | 2011-012511 A | 1/2011 |
| JP | 2011-149204 A | 8/2011 |
| JP | 2016-200904 A | 12/2016 |
| KR | 10-2013-0064373 A | 6/2013 |
| KR | 10-2013-0105098 A | 9/2013 |
| KR | 10-1329520 B1 | 11/2013 |
| KR | 10-2014-0106089 A | 9/2014 |
| KR | 10-1545953 B | 1/2015 |
| KR | 10-1637516 B | 3/2015 |
| KR | 10-2015-0050794 A | 5/2015 |
| KR | 10-1545953 B1 | 8/2015 |
| KR | 10-1698679 B | 8/2015 |
| KR | 10-1726356 B | 11/2015 |
| KR | 10-1763794 B | 2/2016 |
| KR | 10-1749677 B | 2/2017 |
| KR | 10-1717992 B1 | 3/2017 |
| KR | 10-2017-0079857 A | 7/2017 |
| KR | 10-2017-0100173 A | 9/2017 |
| WO | 2013-076760 | 5/2013 |
| WO | 2014005651 A1 | 1/2014 |

OTHER PUBLICATIONS

Japanese Office Action dated Jun. 8, 2021 as received in application No. 2020-534152.
Korean Office Action dated Oct. 28, 2021 as received in application No. 10-2017-0113565.
Korean Office Action dated Oct. 28, 2021 as received in application No. 10-2017-0113566.
Korean Office Action dated Oct. 28, 2021 as received in application No. 10-2017-0113567.
Korean Office Action dated Oct. 28, 2021 as received in application No. 10-2017-0113568.
Taly et al., "Distributed Authorization in Vanadium" 2016.

(56) References Cited

OTHER PUBLICATIONS

International Search Report and Written Opinion dated Dec. 24, 2018, in related PCT Application No. PCT/KR2018/010267 (3 pages).

* cited by examiner

FIG. 5

| MAIN TYPE | SUB-TYPE | Value |
|---|---|---|
| RECEIVER INFORMATION | | USER A |
| ISSUER INFORMATION | | SUPREMA |
| VALIDITY CONDITION | TIME | 21600 |
| | LOCATION | 37.372734±0.01, 127.107333±0.02 |
| AUTHORIZATION INFORMATION | FIRST DOOR | 1 |
| | SECOND DOOR | 0 |
| | THIRD DOOR | 1 |
| | FOURTH DOOR | 0 |
| | FIFTH DOOR | 1 |
| | FRONT DOOR | 1 |
| | BACK DOOR | 0 |
| | FIRST-FLOOR MEETING ROOM | 1 |
| | FIRST PRINTER | 1 |
| | FIRST GUEST ROOM | 0 |
| | SEND MAIL | 1 |
| | WEB-SURFING | 1 |
| | POWER POINT | 1 |

ACCESS CONTROL SYSTEM AND ACCESS CONTROL METHOD USING THE SAME

CROSS-REFERENCE TO RELATED APPLICATION

This application claims priority to and the benefit of Korean Patent Application No. 10-2017-0113565, filed on Sep. 5, 2017, Korean Patent Application No. 10-2017-0113566, filed on Sep. 5, 2017, Korean Patent Application No. 10-2017-0113567, filed on Sep. 5, 2017 and Korean Patent Application No. 10-2017-0113568, filed on Sep. 5, 2017, the disclosure of which is incorporated herein by reference in its entirety.

BACKGROUND

1. Field of the Invention

The present invention relates to an access control system and an access control method using the same.

2. Discussion of Related Art

An access control system is a system that recognizes and manages visitors who intend to access a specific space through a door. Access control systems are being widely used in typical offices and houses as well as in access restricted facilities with high security.

A conventional authentication method used in such an access control system includes an authentication method using a magnetic card, a smart card, contactless smart card, etc., and an authentication method using biometric information such as a fingerprint and an iris of a visitor.

In such a conventional authentication method, a visitor may access a door only after the visitor performs authentication through an authentication device installed near the door. As described above, authentication needs to be performed through a separate authentication device. Thus, when there are a plurality of visitors, it takes a long time to perform authentication. In addition, there is an inconvenience in that a user needs to always carry a separate authentication means such as a magnetic card, etc., and also there is a difficulty in that, when such an authentication means is lost, an unauthorized visitor who steals the separate authentication means can access the door.

Also, in the conventional authentication method, the authentication is performed only by means of a control server that collectively handles authentication devices installed near a door. Thus, it is impossible to access the door when communication between the control server and the authentication devices installed near the door is disconnected or when the control server is disabled.

Recently, in order to overcome such a difficulty, efforts are being made to enhance user convenience and also to increase security of an access control system.

SUMMARY OF THE INVENTION

The present invention is directed to providing an access control system capable of increasing its security while increasing a user's convenience and an access control method using the same.

Technical problems intended to be solved by the invention are not limited to the aforementioned problem, and other technical problems that are not described herein will be clearly understood by those skilled in the art from the following description and the accompanying drawings.

According to an aspect of the present invention, there is provided an access control method in which a door operating device determines whether to open a door on the basis of an authentication token acquired from a user terminal without intervention of an authentication server, the access control method including obtaining the authentication token from the user terminal; determining whether the user have authorization for accessing the door based on a authentication information included in the authentication token; controlling the door to be opened in case of determined that the user have authorization for accessing the door.

According to another aspect of the present invention, there is provided an access control method including obtaining an authentication token from a user terminal by a first door operating device, which is provided at a first door among the plurality of doors; determining whether the user terminal has authority to access the first door on the basis of authentication information included in the authentication token by the first door operating device; Unlocking the first door when the user terminal has the authority to access the first door by the first door operating device; obtaining the authentication token from the user terminal by a second door operating device, which is provided at a second door among the plurality of doors; determining whether the user terminal has authority to access the second door on the basis of the authentication information included in the authentication token by the second door operating device; and unlocking the second door when it is determined that the user terminal has the authority to access the second door by the second door operating device.

According to still another aspect of the present invention, there is provided a non-transitory recording medium having a program recorded thereon for executing the above-described method.

According to still another aspect of the present invention, there is provided a door operating device configured to determine whether to open a door on the basis of an authentication token acquired from a user terminal without intervention of an authentication server, the door operating device including a door communication unit configured to acquire the authentication token from the user terminal; a door driving unit configured to provide power necessary to open the door; and a door control unit configured to determine whether the user terminal has authority to access the door on the basis of authentication information included in the authentication token and configured to control the door driving unit to open the door when it is determined that the user terminal has the authority to access the door.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 is an example diagram of a table indicating a data structure of information included in an authentication token according to an embodiment of the present invention;

DETAILED DESCRIPTION OF EXEMPLARY EMBODIMENTS

Figure 1:
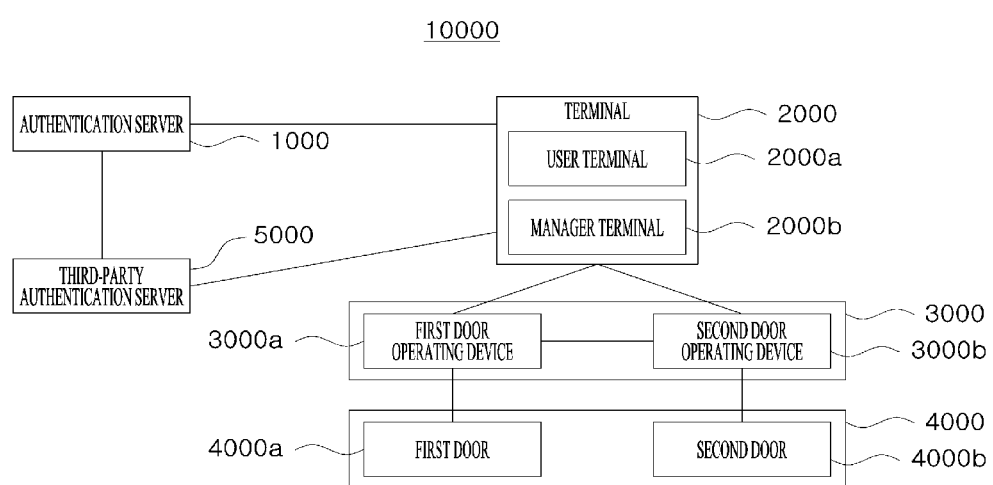
FIG. 1 is a block diagram of an access control system according to an embodiment of the present invention.

The above objects, features, and advantages of the present invention will become more apparent from the following detained description taken in conjunction with the accompanying drawings. However, the present invention may be variously modified and have several embodiments. Therefore, specific embodiments will be shown in and described with reference to the accompanying drawings.

In the figures, the thickness of layers and regions is exaggerated for clarity. Also, when it is mentioned that an element or layer is "on" another element or layer, the element or layer may be formed directly on another element or layer, or a third element or layer may be interposed therebetween. Like reference numerals refer to like elements throughout the specification. Also, the same reference numerals are used to designate elements having the same functions in the same spirit range shown in the drawings of each embodiment.

Moreover, detailed descriptions about well-known functions or configurations associated with the present invention will be ruled out in order not to unnecessarily obscure subject matters of the present invention. It should also be noted that, although ordinal numbers (such as first and second) are used in the following description, they are used only to distinguish similar components.

The suffixes "module" and "unit" for elements used in the following description are given or used interchangeably only for facilitation of preparing this specification, and thus they are not assigned a specific meaning or function.

1. Definition of Terms

The terms used therein will be described as follows.

(1) Door

A door may block or allow passage through one area. A door may include a door frame and a door leaf. A door frame may be a fixed element that defines an area where passage is to be blocked or allowed. A door leaf is an element having a changing position due to an external force. Depending on the position, a place where passage is blocked or allowed may be changed. The change in position of the door leaf may have a comprehensive meaning including rotational movement as well as movement of the entire door leaf. In this specification, such a door frame and door leaf will be collectively referred to as a door. Accordingly, in this specification, movement and change in position of a door may refer to movement and change in position of a door leaf.

(2) Closing/Opening of Door

The closing of a door may refer to a state in which a door leaf is located at a position where passage to an area defined by a door frame is blocked, and the opening of a door may refer to a state in which a door leaf is located at a position where a space for passing through an area defined by a door frame is secured. A door state change used herein may refer to at least one of a change from an open state to a closed state and a change from a closed state to an open state.

Also, a door closing operation may refer to a process of moving a door leaf from an open position to a closed position, and a door opening operation may refer to a process of moving a door leaf from a closed position to an open position.

Also, in this specification, the opening and closing of a door may include a state in which the door can be opened by an unlocking operation as well as by a change in state corresponding to movement of a door leaf or a state in which the door cannot be opened. Accordingly, in some embodiments of the present invention, the closing of a door may refer to a state in which the door is locked, and the opening of a door may refer to a state in which the door is unlocked.

In an embodiment of the present invention, the closing and opening of a door and the locking and unlocking of a door may be independent of each other.

For example, even though a door is not closed, an obstacle may be provided by a locking unit. As another example, even though a door is unlocked, a door leaf may be located at a closed position. Accordingly, a closed state of a door is not necessarily limited to a locked state, and an opened state of a door is not necessarily limited to an unlocked state.

(3) Locking/Unlocking of Door

Locking and unlocking may relate to whether a door can be opened.

The locking of a door may denote that an external force, an obstacle, or the like is provided so that the door cannot be opened, and the unlocking of a door may denote that an external force, an obstacle, or the like that has been provided is removed so that the door can be opened.

Also, a door locking operation may refer to a process of providing an external force and/or an obstacle so that a door cannot be opened, and a door unlocking operation may refer to a process of removing an external force and/or an obstacle that has been provided so that a door cannot be opened.

(4) Access

An access may denote that a user passes through a space defined by a door frame. An access may include an entry in which a user carrying a terminal moves from an outer side to an inner side with respect to a door and an exit in which a user carrying a terminal moves from an inner side to an outer side with reference to a door.

(5) Inner Side/Outer Side with Respect to Door

An inner side with respect to a door may denote a region in which a person with no access authority is restricted from entering through the door, and an outer side with respect to a door may denote an opposite side of the inner side with respect to the door. For example, an authorized user, who has access authority for a specific door, can enter the inner side from the outer side with respect to the door according to embodiments of the present invention. However, an unauthorized person, who does not have the access authority, cannot enter the inner side from the outer side with respect to the door according to embodiments of the present invention.

(6) Token

In this specification, a token may be data of a predetermined format including at least some information used in an access control system. In this specification, a token may be classified into an authentication token, an update token, and so on depending on its use. The authentication token and the update token may have the same type but contain different information. However, the authentication token and the update token need not always have the same format. Depending on the embodiment, the authentication token and the update token may be provided in different formats. In this specification, the type of token may be classified according to the intended use of the token, such as an authentication token and an update token, and the format of token may be any format determined by a service provider and may also include formats such as JSON Web Token (JWT), Security Assertion Markup Language (SAML), and eXtensible Rights Markup Language (XrML).

(7) User Identification Information

User identification information may be information for an access control system 10000 of the present invention to identify a specified user among a plurality of users. For example, user identification information may be identification information uniquely assigned to a user, such as an ID.

(8) User Information

User information may be information used to generate the above-described user identification information. For example, user information is personal information of a user and may be information that is typically required to authenticate the user such as a resident registration number, a date of birth, an address, an employee identification number, and a phone number.

(9) Terminal Identification Information

Terminal identification information may be information for identifying a specified user terminal among a plurality of user terminals. For example, terminal identification information may include at least one of a Universal Unique Identifier (UUID), a Unique Identifier (UID), an IP address, a MAC address, a CPU (MCU) serial number or HDD serial number, and a communication number of a terminal.

(10) Door Identification Information

Door identifier information may be information for identifying a specified door among a plurality of doors. For example, door identification information may be at least one of identification information assigned to a door and identification information assigned to a door operating device. The door identification information may be stored in a door storage unit. Also, according to some embodiments of the present invention, the door authentication information may be included in the authentication token.

2. System Configuration

FIG. 1 is a block diagram of an access control system 10000 according to an embodiment of the present invention.

Referring to FIG. 1, the access control system 10000 may include an authentication server 1000, a terminal 2000, a door operating device 3000, a door 4000, and a third-party authentication server 5000.

The authentication server 1000 may be connected to an external electronic device. Hereinafter, a specific device being connected to another device may at least denote that a specific device is at least physically, electrically, or communicably connected to another device. In the above example, the authentication server 1000 being connected to the external electronic device denotes that the authentication server 1000 and the external electronic device are communicably connected to each other. For example, this may mean that the authentication server 1000 and the external electronic device can transmit and receive data to and from each other.

According to some embodiments of the present invention, the authentication server 1000 may be connected to the terminal 2000. Also, according to some embodiments of the present invention, the authentication server 1000 may be connected to the third-party authentication server 5000. Although not shown in FIG. 1, according to some embodiments of the present invention, the authentication server 1000 may be connected to an office-specific electronic device 6000, a hotel controller 7000, or the like. According to an embodiment of the present invention, the authentication server 1000 may perform authentication.

The authentication server 1000 may perform authentication on a user of the terminal 2000. Alternatively, the authentication server 1000 may perform authentication on the terminal 2000 itself.

The terminal 2000 may be connected to the authentication server 1000 and the door operating device 3000. The terminal 2000 may provide data necessary to register and authenticate the user to the authentication server 1000. Also, the terminal 2000 may transmit data necessary to make a request to open a door to the door operating device 3000 and may acquire data regarding a result of the opening request from the door operating device 3000. In addition, the terminal 2000 may transmit and receive various data to and from the authentication server 1000 and the door operating device 3000.

Also, the terminal 2000 may provide an application for performing some embodiments, which will be described below.

Also, the terminal 2000 may be, for example, a smartphone, a tablet, a notebook, a wearable device, etc. As another example, the terminal 2000 may be a smart card, an integrated circuit (IC) card, a magnetic card, and a radio frequency (RF) chip.

Also, the terminal 2000 may be classified into a user terminal 2000*a* and a manager terminal 2000*b* depending on the role.

The door operating device 3000 may control the opening or closing of a door 4000.

For example, the door operating device 3000 may be installed in the door 4000 to control the door 4000 to be locked or unlocked. The door operating device 3000 is not necessarily installed in a door and may be selectively provided in various forms. For example, the door operating device 3000 may be installed on a wall adjacent to a door to provide or withdraw an obstacle to or from the door. Also, when the door 4000 is an automatic door, the door operating device 3000 may change the location of a door leaf to open or close the door 4000.

Also, the door 4000 may block or allow passage to one area.

Also, the state of the door 4000 may be changed by the door operating device 3000.

Also, according to some embodiments of the present invention, a plurality of door operating devices 3000 may be connected to each other. For example, as shown in FIG. 1, a first door operating device 3000*a* and a second door operating device 3000*b* may be connected to each other. Also, a larger number of door operating devices 3000 than the number shown in FIG. 1 may be connected to each other. Also, not all of the plurality of door operating devices 3000 are necessarily connected with each other, but they may be sequentially connected and provided. For example, the first door operating device 3000*a* may be connected to the second door operating device 3000*b*, and the second door operating device 3000*b* may be connected to a third door operating device (not shown). Also, depending on the case, the plurality of door operating devices 3000 may be connected in parallel to one door operating device 3000. The connection between the plurality of door operating devices 3000 is not limited to the above examples, and may be selectively provided in various forms.

Also, the connection between the plurality of door operating devices 3000 is not essential. According to some embodiments of the present invention, the plurality of door operating devices 3000 may not be connected to each other.

However, the block diagram shown in FIG. 1 is only an example intended for convenience of description and is not limited thereto. According to some embodiments of the present invention, an element may be added to the block diagram of FIG. 1, and the elements shown in FIG. 1 may be excluded or subdivided.

Figure 2:
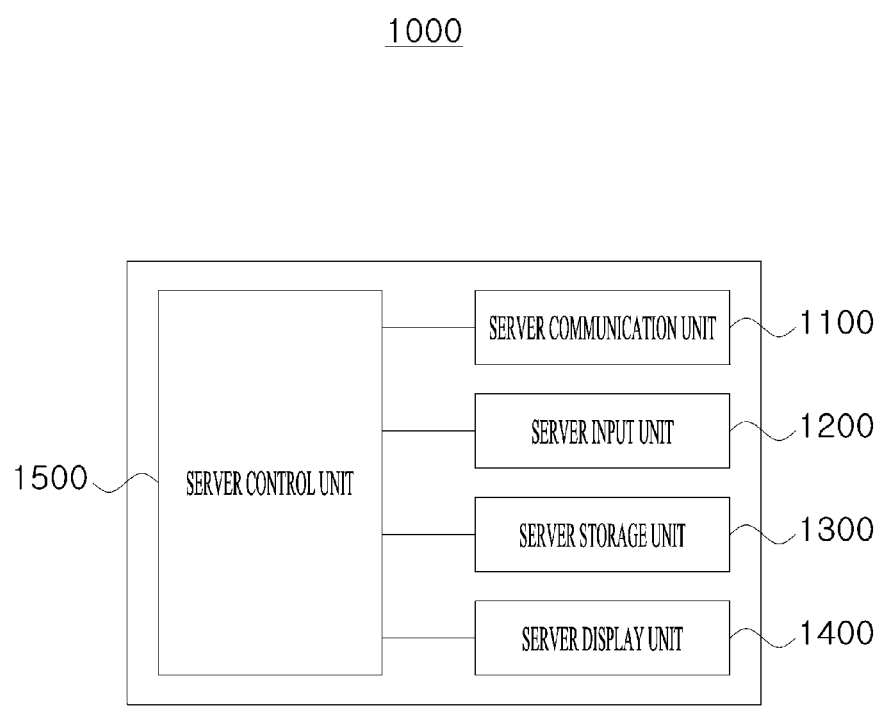
FIG. 2 is a block diagram of an authentication server according to an embodiment of the present invention.

FIG. 2 is a block diagram of the authentication server 1000 according to an embodiment of the present invention.

Referring to FIG. 2, the authentication server 1000 may include a server communication unit 1100, a server input unit 1200, a server storage unit 1300, a server display unit 1400, and a server control unit 1500.

The server communication unit 1100 may connect the authentication server 1000 with an external electronic device. That is, the server communication unit 1100 may transmit or receive data to or from the external electronic device. Also, the server communication unit 1100 may maintain or release the communication connection to the terminal 2000 if necessary. Also, depending on the embodiment, the server communication unit 1100 may be provided so that the connection to the terminal 2000 is maintained on a regular basis.

Also, the server communication unit 1100 may be a communication module for supporting at least one of a wired communication method and a wireless communication method.

The server input unit 1200 may acquire an electric signal corresponding to a user input. For example, the server input unit 1200 may include a keypad, a keyboard, a switch, a button, and a touchscreen.

The server storage unit 1300 may store data.

For example, the server storage unit 1300 may store data acquired from the terminal 2000. As another example, the server storage unit 1300 may store a program necessary to operate the authentication server 1000.

The server display unit 1400 may output visual information.

For example, the server display unit 1400 may be a liquid crystal display (LCD), an organic light-emitting diode (OLED) display, an active-matrix organic light-emitting diode (AMOLED) device, etc.

The server control unit 1500 may collectively handle the operation of the authentication server 1000.

The authentication server 1000 according to the present invention does not necessarily have to include all of the above elements, and some of the elements may be selectively excluded. For example, when the authentication server 1000 does not provide direct visual information, the server display unit 1400 may be excluded from the authentication server 1000. Also, an element for performing an additional function or operation may be selectively provided to the authentication server 1000.

Figure 3:
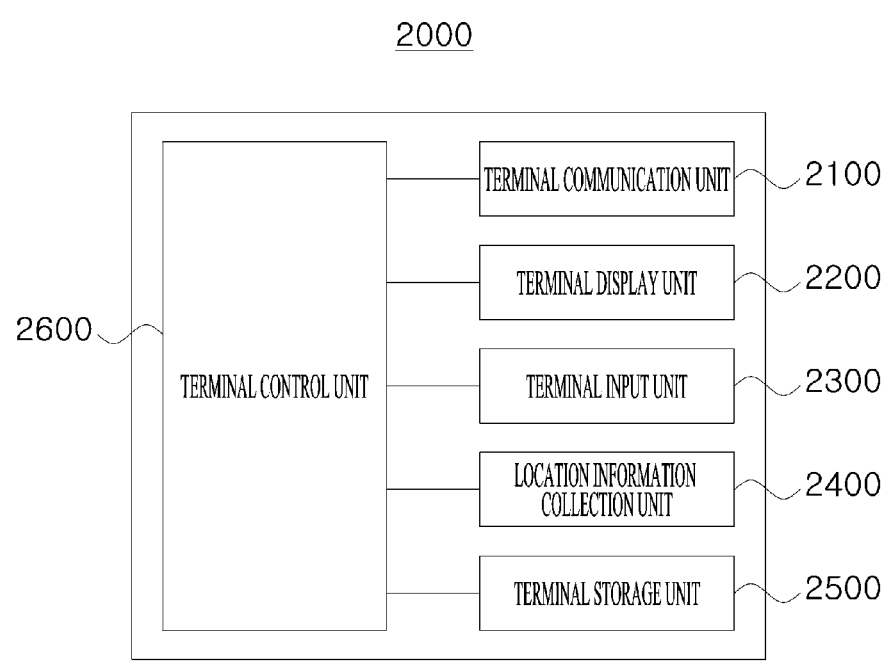
FIG. 3 is a block diagram of a terminal according to an embodiment of the present invention.

FIG. 3 is a block diagram of the terminal 2000 according to an embodiment of the present invention.

Referring to FIG. 3, the terminal 2000 may include a terminal communication unit 2100, a terminal display unit 2200, a terminal input unit 2300, a location information collection unit 2400, a terminal storage unit 2500, and a terminal control unit 2600.

The terminal communication unit 2100 may connect the terminal to an external electronic device. As an example, the terminal communication unit 2100 may connect a user terminal 2000*a* to external electronic devices such as the authentication server 1000, the door operating device 3000, and the third-party authentication server 5000. Also, the terminal communication unit 2100 may be a communication module for supporting wired and/or wireless communication.

The terminal display unit 2200 may output visual information.

When the terminal display unit 2200 may be provided as a touch screen, the terminal display unit 2200 may function as the terminal input unit 2300. In this case, a separate terminal input unit 2300 may selectively not be provided, and a terminal input unit 2300 configured to perform a limited functions using buttons such as a volume control button, a power button, and a home button, may be provided.

The terminal input unit 2300 may acquire a signal corresponding to a user input.

The terminal input unit 2300 may be implemented as, for example, a keyboard, a keypad, a button, a jog dial, or a wheel.

Also, the user input may be, for example, a button press, a touch, or a drag.

When the terminal display unit 2200 may be provided as a touch screen, the terminal display unit 2200 may serve as the terminal input unit 2300.

The location information collection unit 2400 may acquire location information used by the terminal 2000 to determine its location. For example, the location information collection unit 2400 may be a module configured to acquire coordinate information for performing location determination such as a GPS module.

The terminal storage unit 2500 may store data.

The terminal storage unit 2500 may be implemented as, for example, a flash memory, a random access memory (RAM), a read-only memory (ROM), a solid-state drive (SSD), a secure digital (SD) card, or an optical disk.

The terminal storage unit 2500 may store data necessary to operate the terminal 2000.

The terminal control unit 2600 may collectively handle the operation of the terminal 2000.

Figure 4:
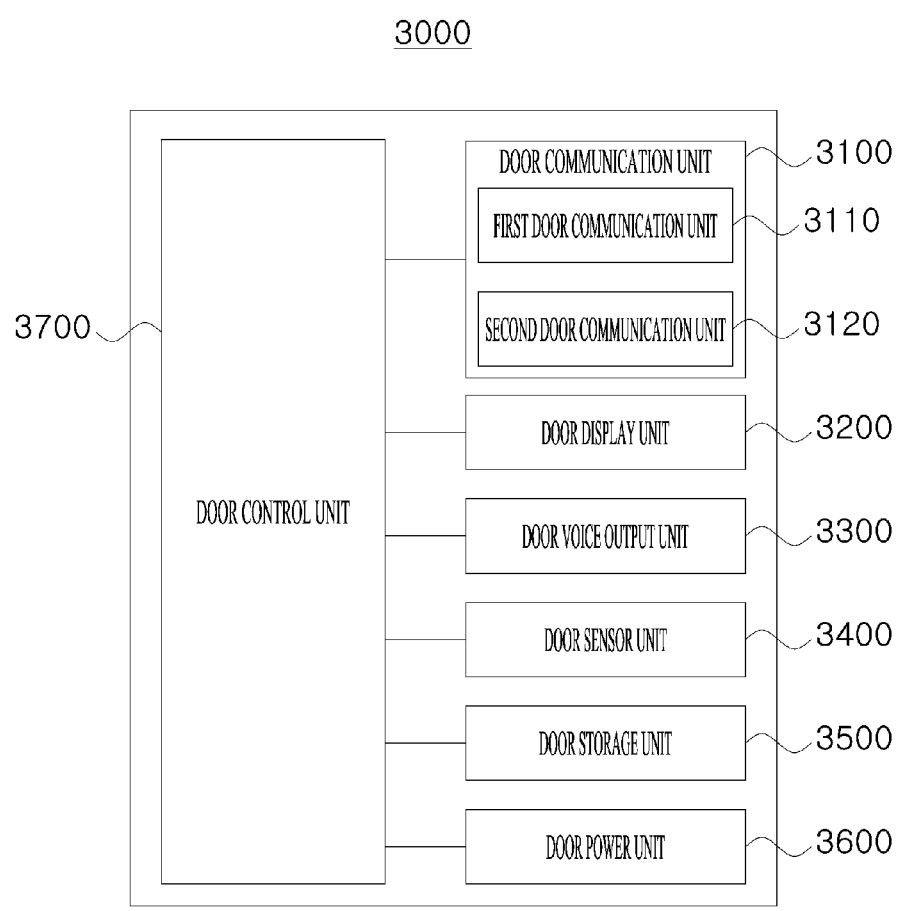
FIG. 4 is a block diagram of a door operating device according to an embodiment of the present invention.

FIG. 4 is a block diagram of the door operating device 3000 according to an embodiment of the present invention.

Referring to FIG. 4, the door operating device 3000 may include a door communication unit 3100, a door display unit 3200, a door voice output unit 3300, a door sensor unit 3400, a door storage unit 3500, a door driving unit 3600, and a door control unit 3700.

The door communication unit 3100 may be a communication module capable of communicating with an external electronic device.

The door communication unit 3100 may connect the door operating device 3000 to the terminal 2000.

The door communication unit 3100 may establish communication in a wireless communication method. For example, the door communication unit 3100 may be a communication module configured to support wireless Internet interfaces such as Wireless LAN (WLAN), Wireless Fidelity (WiFi), and WiFi Direct and wireless communication methods such as Bluetooth, Bluetooth Low Energy (BLE), and Infrared Data Association (IrDA). Also, the door communication unit 3100 may be a reader capable of reading information from an external electronic device such as an RF reader, an IC reader, and a magnetic reader.

The door display unit 3200 may output visual information.

The door display unit 3200 may output information that will be visually provided to the user. When the door display unit 3200 includes a touch panel, the door display unit 3200 may operate as a touch input device.

The door voice output unit 3300 may output information that will be auditorily provided to the user.

For example, the door voice output unit 3300 may be a speaker and a buzzer configured to output sound.

The door sensor unit 3400 may acquire an external environment signal required by the door operating device 3000. For example, the door sensor unit 3400 may acquire a signal regarding a distance from a user, an object, or the like. As another example, the door sensor unit 3400 may acquire a signal necessary to determine the location of a door leaf.

The door storage unit 3500 may store a program for performing a control operation of the door control unit 3700 and may store data received from an external source, data generated by the door control unit 3700, etc.

The door driving unit 3600 may provide power necessary to lock or unlock the door leaf. Also, when the door 4000 is implemented as an automatic door, the door driving unit 3600 may provide power necessary to open or close the door leaf.

The door driving unit 3600 may be provided as a motor, a solenoid, or an actuator.

When the door driving unit 3600 provides power necessary to lock or unlock the door leaf, the door driving unit 3600 may provide power so that a locking unit (not shown) is maintained and/or changed from a locked state to an unlocked state. The locking unit may be provided as, for example, a deadbolt, a latch bolt, or a combination thereof. Also, the locking unit is not limited to the deadbolt and latch bolt that have been described as an example, and typical locking units may be used as the locking unit.

The door control unit 3700 controls the overall operation of the door operating device 3000.

The door control unit 3700 may control operations of some elements included in the door operating device 3000. Also, the door control unit 3700 may acquire signals from some elements included in the door operating device 3000. Also, among steps that will be described in the following methods, the door control unit 3700 may control operations for performing some steps performed by the door operating device 3000 or may execute calculations necessary to perform the steps.

The access control system 10000 associated with various embodiments of the present invention, the elements, operations, and terms included in the access control system 10000, etc. have been described above. The above-described access control system 10000, the elements, operations, and terms included in the access control system 10000, etc. will be applied to various methods and embodiments which will be described below. However, it should be noted that the following access control system 10000 need not necessarily be configured to have the above-described elements and functions and may be applied even to an access control system having a different configuration from the above-described access control system 10000.

3. Authentication Token and Update Token

Overview of Authentication Token

An authentication token is data that is issued to an issuance target by the authentication server 1000 and may be data that may be used to determine authority assigned to the issuance target. Here, the issuance target may include at least one of the user and the terminal 2000. The issuance target may be classified into the user and the terminal 2000, but the authentication token may be issued by transmitting the authentication token to the terminal 2000.

The authentication token may include various information, and information included in the authentication token will be described in detail with reference to FIG. 5.

FIG. 5 is an example diagram of a table indicating a data structure of information included in an authentication token according to an embodiment of the present invention.

Referring to FIG. 5, the authentication token according to some embodiments of the present invention may include at least one of authentication information, which indicates the authority assigned to the issuance target, validity conditions, issuer information, and recipient information. However, FIG. 5 is just an example intended for convenience of description, and the authentication token of the present invention is not limited thereto. Selectively, some information may be excluded therefrom, or various additional information may be added thereto.

Various information that may be included in the authentication token will be described below in detail.

According to some embodiments of the present invention, the authentication token may include authentication information.

According to some embodiments of the present invention, the authentication information may be information that is used to determine whether the issuance target has access authority for a specific door among at least one or more doors 4000.

Also, according to some embodiments of the present invention, the authentication information may be information that is used to determine whether the issuance target has access authority for a specific space among at least one or more spaces. Thus, when authority for a space is assigned, authority for everything provided in the space may be assigned.

Also, according to some embodiments of the present invention, the authentication information may be information that is used to determine whether the issuance target has authority to use a function or an electronic device. Here, the function relates to a service provided by an electronic device and may include, for example, an e-mail function, a web surfing function, and functions of using and editing a Universal Serial Bus (USB) device. Also, when the authority for the function is included in the authentication information, the authentication information may be used to determine whether the issuance target has authority to view a mail, whether the issuance target has authority to send a mail, whether the issuance target has authority to use a USB port, or the like. Also, the electronic device may refer to an office-specific electronic device such as a personal computer (PC), a printer, and a facsimile machine, or an electronic device used in a hotel room or a home room such as a lamp, an air conditioner, a heater, and a television.

According to an embodiment, the authentication information may be generated on the basis of authority that is set for the issuance target.

According to some embodiments of the present invention, the authentication server 1000 may prestore the authority that is set for the issuance target. The authentication server 1000 may acquire authority setting information indicating which authority is set for the issuance target from a manager terminal 2000b and may set the authority for the issuance target on the basis of the acquired authority setting information. The authority setting information is not necessarily acquired through the manager terminal 2000b, but may be acquired in various ways depending on the embodiment. For example, the authentication server 1000 may acquire the authority setting information from a manager through the server input unit 1200.

When the issuance target is a user, the authentication server 1000 may set authority for each pre-registered user and may store the set authority. Also, when the issuance target is the terminal 2000, the authentication server 1000 may set and store authority for each pre-registered terminal 2000.

The setting of authority does not necessarily have to be performed for each individual issuance target, but may be selectively performed for each issuance target group. For example, when issuance targets are grouped on a grade basis, a first type of authority may be set for all issuance targets grouped as grade A, and a second type of authority may be set for all issuance targets grouped as grade B.

On the basis of the set authority, authentication information to be included in authentication information may be determined.

The authentication information according to some embodiments of the present invention may include at least one of information regarding authority to access a door and information regarding authority to use a function or an electronic device.

When the authentication information is information regarding authority to access a door, the authentication information may include at least one of door identification information and an authority value.

The door identification information may include at least a portion of door identification information included in a pre-stored door identification information list.

The authentication information may include authorized door identification information. Alternatively, the authentication information may include all door identification information registered in the authentication server 1000.

The authentication information may include an authority value corresponding to the door identification information. The authority value may be classified into a value indicating that authority is assigned and a value indicating that there is no authority. For example, as shown in FIG. 5, the authentication token may include "first door," which is identification information of a first door, and "1," which is an authority value indicating that authority for the first door is assigned. As another example, as shown in FIG. 5, the authentication token may include "second door," which is identification information of a second door, and "0," which is an authority value indicating that there is no authority.

The authority value of the authentication token according to some embodiments may be omitted. In this case, when a door operating device 3000 receives an authentication token, the door operating device 3000 may determine whether the authority token has authority on the basis of whether identification information of the door operating device 3000 or the door 4000 is included in the authentication token. For example, when the identification information of the door operating device 3000 that has received the authentication or the identification information of the door 4000 is included in the authentication token, the door operating device 3000 may determine that the authentication token has authority.

The authentication information according to some embodiments may be information regarding authority to use a function.

The authentication information may include that of an authorized function and electronic device. Alternatively, the authentication information may include that of a function and an electronic device registered in the authentication server 1000.

Even in this case, like the embodiments of the door operating device 3000, the authentication information may include identification information for identifying a function and an electronic device. Also, the authentication information may include an authority value indicating whether authority for the function and the electronic device is present or not.

Also, the authentication token may include an authentication validity condition.

The authentication token may have a limited period of time in which the authentication token is determined as being valid after being issued. To what time point the authentication token is valid may vary depending on the authentication validity condition.

According to some embodiments of the present invention, whether the authentication token is valid may be determined by at least one of the terminal 2000 and the door operating device 3000. Also, whether the authentication token is valid may be determined on the basis of a validity condition.

Also, the authentication token may further include authentication token state information indicating whether the authentication token is valid or has expired. The authentication token state information may be changed depending on whether the authentication token is valid or has expired.

According to some embodiments of the present invention, when it is determined that the authentication token has expired, the terminal 2000 may set the authentication token state information to expire. Also, according to some embodiments of the present invention, when it is determined that the authentication token has expired, the terminal 2000 may refuse to transmit the authentication token to the door operating device 3000.

The authentication validity condition of the authentication token according to some embodiments of the present invention will be described below as an example.

The validity condition of the authentication token is a condition that is used to determine whether the authentication token is valid, and the authentication validity condition may include at least one of a valid period, the location of the user terminal, the number of times of use, and a request from the authentication server. The authentication validity condition may be provided in a combination of various conditions. In this case, when all the conditions are satisfied, it may be determined that the authentication token is valid. Alternatively, when at least one of the conditions is satisfied, it may be determined that the authentication token is valid, The validity conditions may be equally applied to all authentication tokens. Also, depending on the selection, the validity conditions may be differently assigned for each issuance target or for each grade.

The validity condition of the authentication token according to some embodiments of the present invention may be a valid period. Here, the valid period may indicate a predetermined period of time in which the authentication token can be valid. As an example, the valid period may be initiated when the token is issued. Also, the predetermined period of time may be preset by the authentication server.

For example, the authentication token may include a valid period indicating that the authentication token was valid for six hours from the issuance time. The authentication token may include time information regarding the issuance time and information regarding for how long the authentication token is valid after the issuance time. An entity for determining validity of the authentication token may determine whether the authentication token is valid on the basis of whether the valid period has been exceeded since the issuance time with respect to a current time at which whether the authentication token is valid is determined. In more detail, it is assumed that the issuance time of the authentication token is 0:00 am and the validity condition is that a current time be within six hours from the issuance time. In this case, when the current time at which whether the authentication token is valid is determined is 5:00 am, the door operating device 3000 may determine that the authentication token is valid. When the current time at which whether the authentication token is valid is determined is 7:00 am, the door operating device 3000 may determine that the authentication token is not valid. Here, the validity determining entity is an element for determining whether the authentication token is valid and may be at least one of the authentication server 1000, the terminal 2000, and the door operating device 3000.

As another example, the authentication token may include elapsed time information for determining how much time has passed since the issuance time. When a value corresponding to the elapsed time information gradually increases and reaches a threshold indicating expiration, it may be determined that the authentication token has expired. Depending on the selection, when the value corresponding to the elapsed time information gradually decreases and reaches a threshold, it may be determined that the authentication token has expired.

According to some embodiments of the present invention, the validity condition of the authentication token may be a location.

When the validity condition is a location, the authentication token may be valid only at a predetermined location. That is, when the user terminal is outside of the predetermined location, it may be determined that the authentication token has expired. When the validity condition of the authentication token is a location, whether the authentication token is valid may be determined on the basis of location information acquired from the location information collection unit 2400.

When the determining entity is the authentication server 1000 and the door operating device 3000 rather than the terminal 2000, the terminal 2000 may provide location information to the determining entity so that the determining entity can determine whether the authentication token is valid on the basis of the location information of the terminal 2000. The location information may be at least one of the location of the terminal at a time point when the authentication token was issued and a current location of the terminal.

For example, when a location range included in the validity condition is within 100 m from a company building and a location where the authentication token is issued is out of the location range included in the validity condition, the door operating device 3000 may determine that the authentication token is not valid.

As another example, when a location range included in the validity condition is within 100 m from a company building, the door operating device 3000 may compare the location information acquired from the terminal 2000 to the location range included in the validity condition. When the acquired location information is out of the location range included in the validity condition, the door operating device 3000 may determine that the authentication token is not valid.

As still another example, when it is determined that the current location information is out of the location range included in the validity condition, the terminal 2000 may determine that the authentication token has expired and may change the state of the authentication token to an expired state.

The location range included in the validity condition may be differently assigned for each issuance target or for each grade.

Also, the predetermined location may refer to one point and also a predetermined region based on a specific location. For example, as shown in FIG. 5, when the validity condition is a location, the validity condition may include a range of the location information.

According to some embodiments of the present invention, the validity condition of the authentication token may be the number of times of use. Here, the use of the authentication token may denote that the authentication token is transmitted to a service provider. Alternatively, the use of the authentication token may denote that the authentication token is transmitted to a service provider and then authority is received. When the validity condition is the number of times of use, the authentication token may be valid for only a predetermined number of times of use. That is, when the predetermined number of times of use is exceeded or exhausted, it may be determined that the authentication token has expired. Also, the authentication token may include information for determining the number of times of use. The information for determining the number of times of use does not necessarily have to be included in the authentication token and may be provided as separate information.

For example, it is assumed that the number of times of use as the validity condition is five. When the authentication token is transmitted to the door operating device 3000 five times, it may be determined that the authentication token has expired.

As another example, it is assumed that the validity condition is seven uses. When the authentication token is transmitted to the door operating device 3000 seven times, it may be determined that the authentication token has expired.

As still another example, it is assumed that the validity condition is three uses. When the authentication token is transmitted to the door operating device 3000, but access authentication fails (for example, a rejection message is received three times), it may be determined that the authentication token has expired.

According to some embodiments of the present invention, the authentication token may include access status information.

The access status information may be information for determining whether a user has entered or has exited. Various embodiments associated with the access status information will be described in detail in section 4.2 titled "Access status management method."

According to some embodiments of the present invention, the authentication token may include issuer information.

The issuer information may be identification information for identifying an authentication server 1000 that has issued the authentication token. The issuer information may be identification information for identifying a service provider that operates the authentication server 1000 that has issued the authentication token. The issuer information may be used to determine whether the authentication token is issued from an authorized issuer.

According to some embodiments of the present invention, the authentication token may include recipient information.

The authentication token may be issued to at least one of the user and the terminal 2000.

Accordingly, the recipient information may be information for identifying who has issued the authentication token. Here, the recipient information may include at least one of user identification information and terminal identification information.

According to some embodiments of the present invention, the authentication token may include authentication token state information.

The authentication token state information may be information indicating whether the authentication token is valid or has expired.

3.2 Issuance of Authentication Token 3.2.1 User Registration (Registration of User and Setting of Authority)

A user registration method according to an embodiment of the present invention will be described below with reference to FIG. 6.

The user registration which will be described below is to register, in the authentication server 1000, at least one of information regarding a user who uses the access control system 10000 and a user terminal 2000a the user intends to use.

Figure 6:
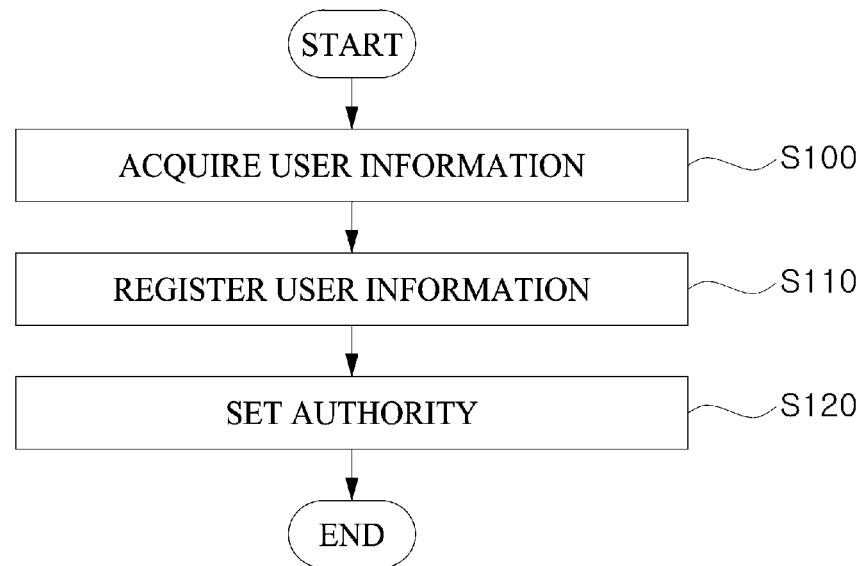
FIG. 6 is a flowchart of a user registration method according to an embodiment of the present invention.

FIG. 6 is a flowchart of the user registration method according to an embodiment of the present invention.

Referring to FIG. 6, the user registration method according to an embodiment of the present invention may include acquiring user information (S100), registering the user information (S110), and setting authority for the user information (S140).

According to some embodiments of the present invention, the registration of the user information may be performed (S110). The acquisition of the user information may be an authentication server 1000 acquiring at least one of user information and terminal identification information.

The authentication server 1000 may acquire the user information in various ways.

The authentication server 1000 may acquire the user information from a user terminal 2000a. Also, the authentication server 1000 may acquire the user information from the third-party authentication server 5000.

When the authentication server 1000 acquires the user information from the user terminal 2000a, the authentication server 1000 may receive and acquire the user information from the user terminal 2000a. For example, the user terminal 2000a may receive and acquire user information from a user of the user terminal 2000a and may transmit the acquired user information to the authentication server 1000.

When the authentication server 1000 acquires user information from a third-party authentication server 5000 designated by the user, the authentication server 1000 may acquire information regarding the third-party authentication server 5000 to which the user information will be provided from the user terminal 2000a. The authentication server 1000 may request the third-party authentication server 5000 to provide the user information and may acquire the user information.

The above-described user information acquisition is merely an example intended for convenience of description, and various typical user information provision methods may be used.

Also, according to some embodiments of the present invention, the registration of the acquired user information may be performed (S110). The registration of the user information may be initiated by the authentication server 1000. The registration of the user information may be assigning unique user identification information to an issuance target, matching the user identification information to the user information, and storing the user identification information matched to the user information.

The user information assigned to the issuance target registration of the user information may be arbitrarily determined by the authentication server 1000. Also, the authentication server 1000 may assign user identification information requested by the user terminal 2000a to the issuance target.

The authentication server 1000 may transmit the user identification information to the user terminal 2000a so that the user can be aware of the user identification information.

Also, the authentication server 1000 may set a security key corresponding to the user identification information. The security key corresponding to the user identification information may be acquired from the user terminal 2000a. Also, the security key corresponding to the user identification information may be generated and acquired by the authentication server 1000. When the security key is generated and set by the authentication server 1000, the authentication server 1000 may transmit the set security key to the user terminal 2000a so that the user can be aware of the security key.

Also, according to some embodiments of the present invention, the setting of authority for the registered user information may be performed (S130). The setting of authority for the user information may be initiated by the authentication server 1000.

The setting of authority may be performed on the basis of authority setting information as in the above-described overview of the authentication token.

The authentication server 1000 may store the user information and authentication information corresponding to the user information.

3.2.2 User Authentication and Token Issuance

A user authentication and token issuance method according to an embodiment of the present invention will be described below with reference to FIG. 7.

Figure 7:
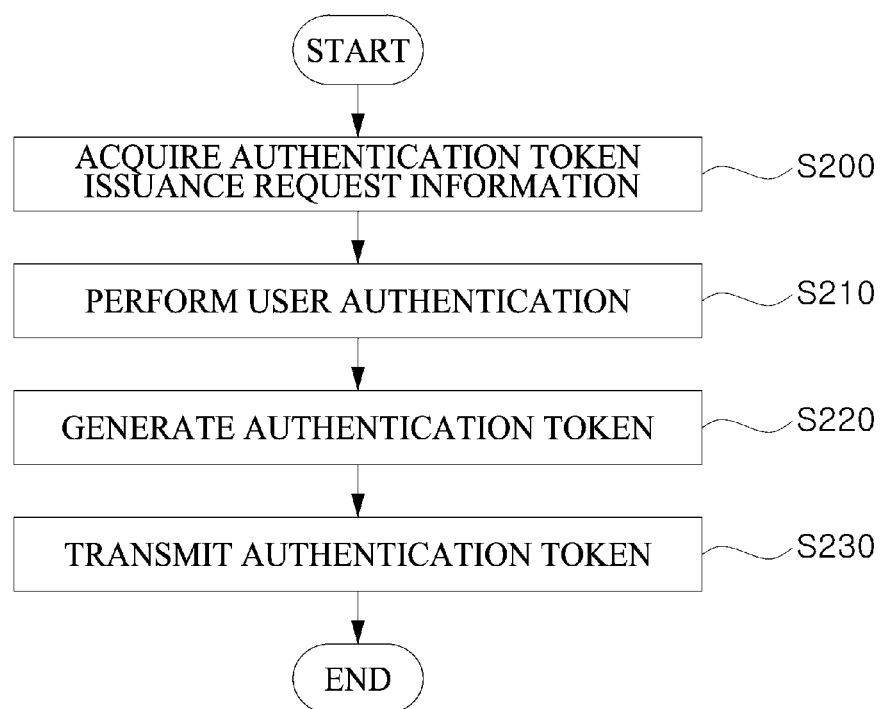
FIG. 7 is a flowchart of an authentication token issuance method according to an embodiment of the present invention.

FIG. 7 is a flowchart of an authentication token issuance method according to an embodiment of the present invention.

Referring to FIG. 7, the authentication token issuance method may include acquiring authentication token issuance request information (S200), performing user authentication (S210), generating an authentication token (S220), and transmitting the authentication token to a user terminal (S230).

According to some embodiments of the present invention, the acquisition of authentication token issuance request information may be performed (S200). The acquisition of authentication token issuance request information may be an authentication server 1000 acquiring the authentication token issuance request information from a user terminal 2000*a*.

The authentication token issuance request information may include user identification information and a security key.

Accordingly, the authentication server 1000 may acquire the user identification information and the security key from the user terminal 2000*a*.

According to some embodiments of the present invention, the user authentication may be performed (S210).

The authentication server 1000 may determine whether a user of the user terminal 2000*a*, which requests an issuance of the authentication token, is authorized.

The authentication server 1000 may determine whether the user is authorized on the basis of whether the acquired user identification information and the security key corresponding to the user identification information are valid.

The authentication server 1000 may determine whether the user identification information acquired from the user terminal 2000*a* and the security key corresponding to the user identification information are valid.

When the user identification information acquired from the user terminal 2000*a* is pre-registered, the authentication server 1000 may determine that the acquired user identification information is valid.

Also, when the acquired security key corresponds to the security key stored and matched to the user identification information, the authentication server 1000 may determine that the security key is valid.

When the acquired user identification information and security key are valid, the authentication server 1000 may determine that the user is authorized.

Also, the authentication server 1000 may acquire at least one of user information, user identification information, and a security key from the third-party authentication server 5000 to determine whether the user is authorized.

Also, the authentication server 1000 may acquire an authentication result from the third-party authentication server 5000 to determine whether the user is authorized.

When it is determined that the user is not authorized, the authentication server 1000 may transmit a message indicating that the authentication has failed to the user terminal 2000*a*.

According to some embodiments of the present invention, the generation of an authentication token may be performed (S220).

When the user is authorized, the authentication server 1000 may generate an authentication token to be transmitted to the user terminal 2000*a*. The authentication server 1000 may generate the authentication token on the basis of the authentication information assigned to the user identification information.

According to some embodiments of the present invention, the transmission of the authentication token to a user terminal 2000*a* may be performed (S230).

The authentication server 1000 may transmit the generated authentication token to the user terminal 2000*a*. Also, the authentication server 1000 may generate an update token corresponding to the authentication token and may transmit the generated update token to the user terminal 2000*a*.

3.3 Update of Token 3.3.1 Update Token

As described above, it may be determined whether the authentication token is valid or has expired according to a predetermined condition.

That is, conditions regarding how long or under which condition the authentication token is valid may be set for the authentication token. When such a validity condition is not satisfied, the authentication token should be updated or reissued.

According to some embodiments of the present invention, the update token may be used to update the authentication token. When or before the authentication token expires, the update token may be used to update the authentication token with a new authentication token. When there is no update token and the authentication token has expired, authentication may have to be regenerated in order to reissue the authentication token. In order to address this inconvenience, a new authentication token may be issued by means of an update token without separate authentication while the update token is valid, thereby increasing user convenience.

The update token may include update token identification information, update conditions, authentication token identification information regarding a corresponding authentication token, and a validity condition of the update token.

The update token identification information may be information for identifying a plurality of issued update tokens.

The update condition may be a condition for updating the authentication token. The update conditions will be described in detail in section 4.4 titled "Update of authentication token."

The corresponding authentication token identification information may be identification information of an authentication token to be updated through the update token.

The update token may include a validity condition.

For example, the update token may have a limited period in which the update token is issued and determined as being valid. At what point the update token is valid may vary depending on the validity condition.

The validity condition of the update token may be an elapsed time since the issuance time, the number of updates, a location of the user terminal, a request from the authentication server, etc.

The validity condition of the update token may be applied to the validity condition of the authentication token.

According to some embodiments of the present invention, the validity condition of the update token may be an elapsed time since the issuance time.

For example, the update token may include a valid period indicating that the update token was valid for six hours since the issuance time. The update token may include time information regarding the issuance time and information regarding for how long the update token is valid after the issuance time. An entity for determining validity of the update token may determine whether the update token is valid on the basis of whether the valid period has been exceeded since the issuance time with respect to a current time at which whether the update token is valid is determined. In more detail, it is assumed that the issuance time of the update token is 0:00 am and the validity condition is that the current time is within six hours from the issuance time. In this case, when the current time at which whether the update token is valid is determined is 5:00 am, the terminal 2000 may determine that the update token is valid. When the current time at which whether the update token is valid is determined is 7:00 am, the terminal 2000 may determine that the update token is not valid. Here, the validity determining entity is an element for determining whether the update token is valid and may be at least one of the authentication server 1000, the terminal 2000, and the door operating device 3000.

As another example, the update token may include elapsed time information for determining how much time has passed since the issuance time. When a value corresponding to the elapsed time information gradually increases and reaches a threshold indicating expiration, it may be determined that the update token has expired. Depending on the selection, when the value corresponding to the elapsed time information gradually decreases and reaches a threshold, it may be determined that the update token has expired.

According to some embodiments of the present invention, the validity condition of the update token may be the number of updates.

For example, it is assumed that the validity condition is five updates. When the update token is transmitted to the authentication server 1000 five times, it may be determined that the update token has expired.

As another example, it is assumed that the validity condition is seven updates. When the update token is transmitted to the authentication server 1000 seven times and thus the authentication token is updated seven times, it may be determined that the update token has expired.

As still another example, it is assumed that the validity condition is three updates. When the update token is transmitted to the authentication server 1000 three times and thus a rejection message is received three times, it may be determined that the update token has expired. According to some embodiments of the present invention, the validity condition of the update token may be a location of the terminal 2000.

When the terminal 2000 is placed at a predetermined location, it may be determined that the update token is valid. When the terminal 2000 is placed outside of a predetermined location, it may be determined that the updated token is not valid.

When the determining entity is the authentication server 1000 rather than the terminal 2000, the terminal 2000 may provide location information to the authentication server 1000 so that the authentication server 1000 can determine whether the update token is valid on the basis of the location information of the terminal 2000. The location information may be at least one of the location of the terminal at a time point when the update token was issued and a current location of the terminal. The update token is also issued when the authentication token is initially issued. Thus, location information at a time point when the authentication token was issued may be the same as location information at a time point when the update token was issued. Accordingly, the location information at the time point when the update token was issued may be replaced with the location information at the time point when the authentication token is issued.

For example, when a location range included in the validity condition is within 100 m from a company building and a location where the update token is issued is out of the location range included in the validity condition, the door operating device 3000 may determine that the update token is not valid.

As another example, when a location range included in the validity condition is within 100 m from a company building, the door operating device 3000 may compare the location information acquired from the terminal 2000 to the location range included in the validity condition. When the acquired location information is out of the location range included in the validity condition, the door operating device 3000 may determine that the update token is not valid.

As still another example, when it is determined that the current location information is out of the location range included in the validity condition, the terminal 2000 may determine that the update token has expired and may change the state of the update token to an expired state. When it is determined that the update token is not valid, the authentication server 1000 may refuse to update the authentication token.

3.3.2 Update of Authentication Token (Embodiment of Update Token)

According to some embodiments of the present invention, the authentication token may be updated.

The update of the authentication token may denote that a new authentication token is issued by the authentication server. The new authentication token may have the same authentication information as a pre-issued authentication token. However, when there is a change of authority, the new authentication token may have different authentication information from the pre-issued authentication token.

Also, the new authentication token may have a different valid period from the pre-issued authentication token.

The terminal 2000 may transmit the update token to the authentication server 1000 to make a request to update the authentication token.

The authentication server 1000 may transmit an authentication token corresponding to the transmitted update token to the terminal 2000.

According to some embodiments of the present invention, an update condition may be set for the update token.

According to some embodiments of the present invention, when the authentication token has expired, the terminal 2000 may transmit the update token to the authentication server 1000 to make a request to update the authentication token.

For example, when it is determined that the authentication token has expired, the terminal 2000 may transmit the update token to the authentication server 1000 to make a request to update the authentication token. As another example, when an expiration message indicating that the authentication token has expired is received from the door operating device 3000, the terminal 2000 may transmit the update token to the authentication server 1000 to make a request to update the authentication token.

According to some embodiments of the present invention, a predetermined period may be set for the update token as the update condition.

When the predetermined period of time has passed from the issuance time of the update token, the terminal 2000 may transmit the update token to the authentication server 1000 to make a request to update the authentication token.

When the update time is reached, the terminal 2000 may transmit an authentication token to the authentication server 1000 to make a request to update the authentication token.

The update token may include information regarding a period of time remaining until the update time. When the remaining period of time included in the update token is subtracted from the predetermined update time, the terminal 2000 may transmit the update token to the authentication server 1000 to make a request to update the authentication token.

For example, when 1000 sec is set for the update token as the remaining period information, the terminal 2000 may transmit the update token to the authentication server 1000 at the update time when the time decreases from 1000 sec to 0 sec in order to make a request to update the authentication token.

As another example, when 1000 sec is set for the update token, the terminal 2000 may transmit the update token to the authentication server 1000 every 100 seconds to make a request to update the authentication token.

According to some embodiments of the present invention, the authentication token may be updated after whether to update the authentication token is determined on the basis of the location.

When the user terminal 2000 enters a predetermined location, the user terminal 2000 may transmit the update token to the authentication server 1000 to make a request to update the authentication token.

According to some embodiments of the present invention, the authentication token may be updated after whether to update the authentication token is determined on the basis of the user's request.

When a user input for an update request is entered, the terminal 2000 may transmit the update token to the authentication server 1000 to make a request to update the authentication token.

According to some embodiments of the present invention, whether the authentication token is updated may be determined depending on whether connection is established between the terminal 2000 and the door operating device 3000.

In an embodiment, the authentication token may be updated when communication is established between the terminal 2000 and the door operating device 3000. In this case, the updated authentication token may be transmitted to the door operating device 3000.

When communication is established with the door operating device 3000, the terminal 2000 may transmit the update token to the authentication server 1000 to make a request to update the authentication token.

The terminal 2000 may transmit the updated authentication token to the door operating device 3000.

According to some embodiments of the present invention, the authentication token may be updated when a result obtained by determining whether to open the door is received from the door operating device 3000. For example, the terminal 2000 may transmit the authentication token to the door operating device 3000 to receive a result obtained by determining whether to open the door.

When the result obtained by determining whether to open the door is received from the door operating device 3000, the terminal 2000 may transmit the update token to the authentication server 1000 in order to make a request to update the authentication token.

According to some embodiments of the present invention, the update token may be updated according to a predetermined condition. According to some embodiments of the present invention, both of the authentication token and the update token may have expired according to the above-described validity conditions. When both the authentication token and the update token have expired, the authentication token and the update token may have to be reissued through re-authentication.

When both of the authentication token and the update token have expired, the authentication server 1000 may perform user authentication and then issue the authentication token and the update token to the terminal 2000.

According to some embodiments of the present invention, the update token may be updated.

When the valid period of the update token is within a predetermined period of time, the update token may be updated.

For example, the authentication server 1000 may acquire the update token from the terminal 2000 in order to update the authentication token. In this case, when a period of time remaining until expiration of the update token is within the predetermined period of time, the authentication server 1000 may update the update token and transmit the updated update token to the terminal 2000. The update of the update token of the authentication server 1000 may be initializing the period of time remaining until the expiration.

As another example, when the period remaining until the expiration of the update token is within the predetermined period of time, the terminal 2000 may transmit the update token to the authentication server 1000 to make a request to update the update token.

According to some embodiments of the present invention, when the terminal 2000 is placed at a predetermined location, the update token may be updated.

According to some embodiments of the present invention, the update token may be updated after whether to update the update token is determined on the basis of the user's request.

When a user input for making a request to update the update token is entered, the terminal 2000 may transmit the update token to the authentication server 1000 to make a request to update the authentication token.

The authentication server 1000 may determine whether the transmitted update token is valid. When the update token is valid, the authentication server 1000 may transmit an authentication token corresponding to the update token to the terminal 2000. Also, when the transmitted update token is not valid, the authentication server 1000 may determine that the update is not possible and may transmit a message indicating that the update is not possible to the terminal 2000.

The authentication server 1000 may determine whether the update token is valid on the basis of an elapsed time since the issuance time, a location of the terminal 2000, the number of times the update token is updated, and so on.

Also, the authentication server 1000 may acquire the location information of the terminal 2000 from the terminal 2000 in order to determine whether the update token is valid on the basis of the location of the terminal 2000.

4. Utilization of Authentication Token

The access control system 10000 of the present invention may perform various operations by using the acquired authentication token.

Various sub-embodiments of the access control system 10000 will be described below in more detail.

However, for convenience of description, a process after the user terminal 2000a acquires the authentication token from the authentication server 1000 will be described below. The process in which the user terminal 2000a acquires the authentication token from the authentication server 1000 has been described in section 3 titled "Authentication token and update token," and thus a detailed description thereof will be omitted.

4.1. Door Opening Management Method

A conventional access control system includes an access control server and an access control device. When a user requests an access, the access control server and the access control device are systematically linked to determine whether to allow the access.

Such a conventional system may determine whether to allow an access only when the access control server and the access control device are able to communicate with each other and also perform their respective roles. Accordingly, when the access control server is disabled or when a problem arises in communication between the access control server and the access control device, a user access cannot be allowed.

A door opening control method according to an embodiment of the present invention will be described below with reference to FIGS. 8 and 9.

Figure 8:
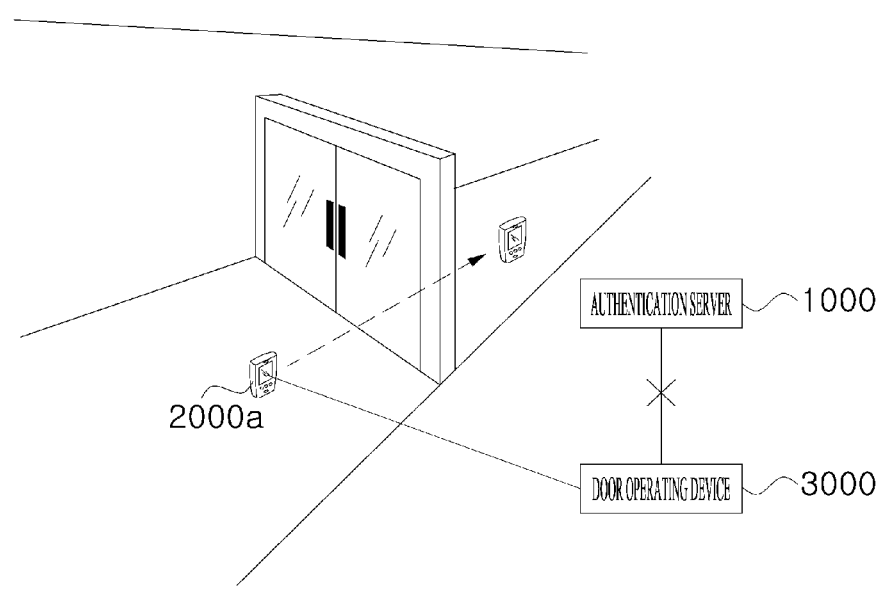
FIG. 8 is a surrounding view for a door opening control method according to an embodiment of the present invention.

FIG. 8 is a surrounding view of the door opening control method according to an embodiment of the present invention.

As illustratively shown in FIG. 8, according to the door opening control method according to an embodiment of the present invention, a user terminal 2000a transmits an authentication token to a door operating device 3000, and the door operating device 3000 determines whether to open a door 4000 on the basis of the authentication token and opens the door 4000 when the authentication token has authority to open the door 4000. Thus, a user of the user terminal 2000a may access the door 4000.

As described in section 3 titled "Authentication token and update token," the user terminal 2000a acquires the authentication token by the authentication server issuing the authentication token to the user terminal 2000a.

In the door opening control method according to an embodiment of the present invention, the authentication server 1000 may not be involved in a series of processes in which the user terminal 2000a makes a request to open the door by means of the authentication token and the door operating device 3000 determines whether to open the door.

Accordingly, the door opening control method according to an embodiment of the present invention, unlike the conventional access control system, may allow an access without any problem when an authentication token is valid even though the authentication token is disabled.

The basic concept of the door opening control method according to an embodiment of the present invention may be applied to the following various embodiments.

A door opening control method according to a first sub-embodiment of the present invention will be described below with reference to FIG. 9.

Figure 9:
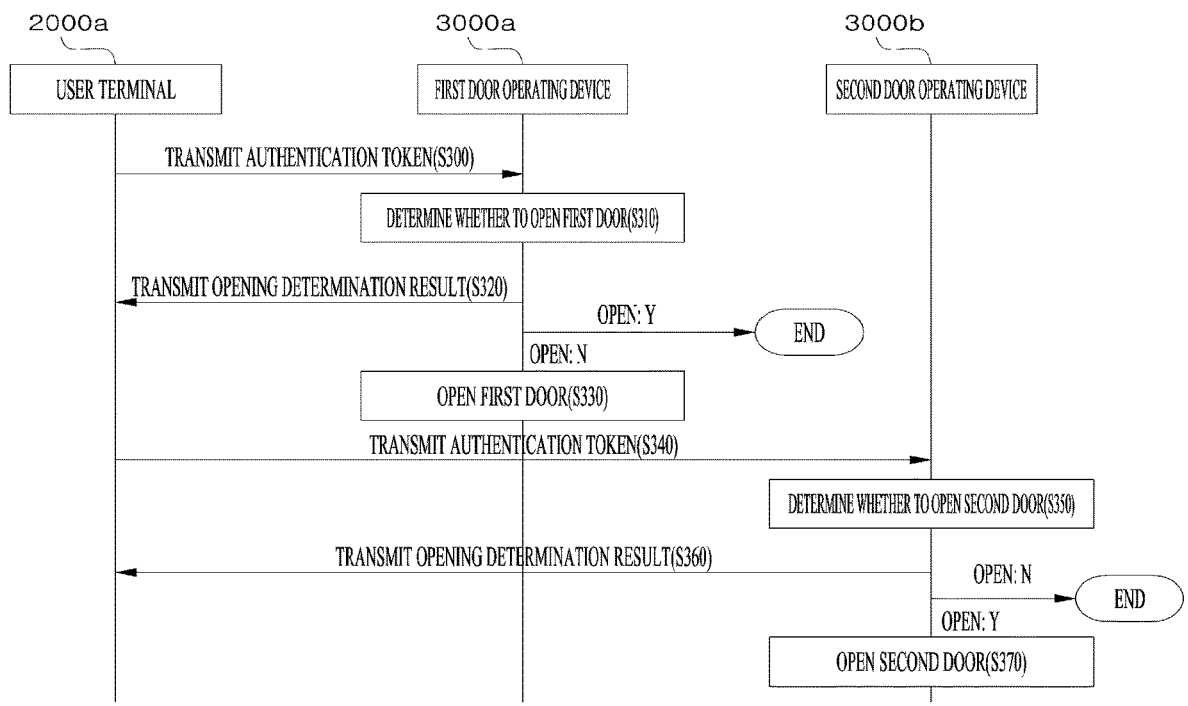
FIG. 9 is a sequence chart of a door opening control method according to an embodiment of the present invention.

FIG. 9 is a flowchart of a door opening control method according to an embodiment of the present invention.

Referring to FIG. 9, the door opening control method may include a user terminal 2000a transmitting an authentication token to a first door operating device 3000a (S300), the first door operating device 3000a determining whether to open a door (S310), the first door operating device 3000a transmitting a result of the determination for the opening (S320), the first door operating device 3000a opening the door (S330), the user terminal 2000a transmitting the authentication token to a second door operating device 3000b (S340), the second door operating device 3000b determining whether to open the door (S350), the second door operating device 3000b transmitting the opening determination result (S360), and the second door operating device 3000b opening the door (S370).

According to some embodiments of the present invention, the transmission of an authentication token to the first door operating device 3000a may be performed by the user terminal 2000a (S300).

When communication with the first door operating device 3000a is established, the user terminal 2000a may transmit a prestored authentication token to the first door operating device 3000a. As an example, the user terminal 2000a may automatically transmit a prestored authentication token to the first door operating device 3000a even though there is no separate user request.

Alternatively, the user terminal 2000a may transmit a prestored authentication token to the first door operating device 3000a when a user request is input. For example, the user terminal 2000a may inform a user that the communication with the first door operating device 3000a has been established. When an authentication token transmission request is input from the user while the communication with the first door operating device 3000a is established, the user terminal 2000a may transmit an authentication token to the first door operating device 3000a. As another example, when the communication with the first door operating device 3000a is established while an authentication token transmission request is input from the user, the user terminal 2000a may transmit a prestored authentication token to the first door operating device 3000a. However, in order to determine the user's cancellation intent due to a false input and a change in situation, when the user terminal 2000a is not connected to the first door operating device 3000a within a predetermined amount of time from a time when the authentication token transmission request is input, the user terminal 2000a may determine that the user has a cancellation intent and may cancel the authentication token transmission request. When the authentication token transmission request is cancelled, the user terminal 2000a may not transmit a prestored authentication token to the first door operating device 3000a even though the user terminal 2000a is connected to the first door operating device 3000a.

The above-described prestored authentication token to be transmitted may refer to at least one authentication token stored in the user terminal 2000a.

When the valid authentication token is present among prestored authentication tokens, the user terminal 2000a may transmit no authentication token to the first door operating device 3000a.

Also, according to some embodiments of the present invention, the determination of whether to open a door may be performed by the first door operating device 3000a (S310).

The determination of whether to open a door may be performed on the basis of authority included in authentication information.

The authority determination of the door operating device 3000 may be provided in various ways.

A first way may be determining authority when the authentication token includes door identification information of a door to which the authority is assigned.

In the first way, the first door operating device 3000a may determine whether door identification information corresponding to the first door operating device 3000a is included in the authentication token. The first door operating device 3000a may determine whether the authentication token has authority when the door identification information corresponding to the first door operating device 3000a is included in the authentication token.

A second way may be determining authority when the authentication token includes at least one of authorized door identification information and unauthorized door identification information and also includes authentication information therefor.

In the second way, the first door operating device 3000a may determine whether authority for a door corresponding to the first door operating device 3000a is included in the authentication token.

The first door operating device 3000a may determine whether first door identification information corresponding to the first door operating device 3000a is included in the authentication token. Also, the first door operating device 3000a may determine whether authority corresponding to the first door identification information is authority to pass through the door.

Also, the first door operating device 3000a may determine whether to open the door in further consideration of whether the authentication token is valid. When a valid period included in the authentication token has expired, the first door operating device 3000a may determine that the authentication token is not authorized to open the door.

Also, according to some embodiments of the present invention, the transmission of a result of the determination for the opening may be performed by the first door operating device 3000a (S320).

The first door operating device 3000a may transmit the opening determination result to the user terminal 2000a.

When the opening determination result is that the authentication token has authority to open the door 4000, the first door operating device 3000a may transmit permission information indicating that it has been determined that the authentication token has authority to the user terminal 2000a. Also, the first door operating device 3000a may issue a notification that it has been determined that the authentication token has authority by outputting at least one of auditory information and visual information through a separate output unit.

Also, when the opening determination result is that the authentication token is not authorized to open the door 4000, the first door operating device 3000a may transmit a message indicating that the opening of the door 4000 is not allowed to the user terminal 2000a.

The step S320 described above is not necessarily essential and may be omitted according to some embodiments. Also, the step S320 is not necessarily preceded by the step S330 and may be performed during or after the step S330 according to some embodiments.

Also, according to some embodiments of the present invention, the opening of the door may be performed by the first door operating device 3000a (S330).

When it is determined that the authentication token includes authority to open the door 4000, the first door operating device 3000a may provide power through a door driving unit 3600 so that the door leaf can be unlocked. Also, when the door 4000 is an automatic door, the first door operating device 3000a may provide power through the door driving unit 3600 so that the door leaf can be opened.

After the door leaf is unlocked, the first door operating device 3000a may provide power through the door driving unit 3600 so that the door leaf is locked on the basis of a locking condition. The first door operating device 3000a may determine whether the door leaf is closed again on the basis of a signal acquired from a door sensor unit 3400. When the door leaf is closed again, the first door operating device 3000a may provide power through the door driving unit 3600 so that the door leaf can be locked. Also, the first door operating device 3000a may provide power through the door driving unit 3600 in further consideration of a locking standby time so that the door leaf can be locked after the locking standby time even though the door leaf is closed again.

Also, according to some embodiments of the present invention, the transmission of an authentication token to a second door operating device 3000b may be performed by the user terminal 2000a (S340).

When communication with the second door operating device 3000b is established, the user terminal 2000a may transmit a prestored authentication token to the second door operating device 3000b.

Also, according to some embodiments of the present invention, the determination of whether to open the door may be performed by the second door operating device 3000b (S350).

The second door operating device 3000b may determine whether door identification information corresponding to the second door operating device 3000b is included in the authentication token. When the door identification information corresponding to the second door operating device 3000b is included in the authentication token, the second door operating device 3000b may determine whether the authentication token has authority to open the door 4000.

The second door operating device 3000b may determine whether authority to open the door 4000 corresponding to the second door operating device 3000b is included in the authentication token.

The second door operating device 3000b may determine whether second door identification information corresponding to the second door operating device 3000b is included in the authentication token. Also, the second door operating device 3000b may determine whether authority corresponding to the second door identification information is authority to open the door 4000.

Also, according to some embodiments of the present invention, the transmission of the opening determination result may be performed by the second door operating device 3000b (S360).

The second door operating device 3000b may transmit the result of the determination for the opening to the user terminal 2000a.

When the result of the determination for the opening is that the authentication token has authority to open the door 4000, the second door operating device 3000b may transmit permission information indicating that it has been determined that the authentication token has authority to open the door 4000 to the user terminal 2000a. Also, the second door operating device 3000b may inform that it has been determined that the authentication token has authority to open the door 4000 by outputting at least one of auditory information and visual information through a separate output unit.

Also, when the opening determination result is that the authentication token is not authorized to open the door 4000, the second door operating device 3000b may transmit a message indicating that the opening of the door 4000 is not allowed to the user terminal 2000a.

Also, according to some embodiments of the present invention, the opening of the door may be performed by the second door operating device 3000b (S370).

When it is determined that the authentication token includes authority to open the door 4000, the second door operating device 3000b may provide power through the door driving unit 3600 so that the door leaf can be unlocked. Also, when the door 4000 is an automatic door, the second door operating device 3000b may provide power through the door driving unit 3600 so that the door leaf can be opened.

After the door leaf is unlocked, the second door operating device 3000b may provide power through the door driving unit 3600 so that the door leaf is locked on the basis of a locking condition. The second door operating device 3000b may determine whether the door leaf is closed again on the basis of a signal acquired from the door sensor unit 3400. When the door leaf is closed again, the second door operating device 3000b may provide power through the door driving unit 3600 so that the door leaf can be locked. Also, the second door operating device 3000b may provide power through the door driving unit 3600 in further consideration of a locking standby time so that the door leaf can be locked after the locking standby time even though the door leaf has been closed again.

Accordingly, for the access request and the permission according to the first sub-embodiment of the present invention, the user terminal 2000a may open the door 4000 to which the authority is assigned by using the authentication token acquired from the authentication server 1000. Thus, when the prestored authentication token is valid, the user terminal 2000a does not perform additional authentication with the authentication server 1000, and the user may freely access a door to which the authority is assigned among a plurality of doors 4000.

4.2. Access Status Management Method

An access status management method according to an embodiment of the present invention will be described below with reference to FIGS. 10 to 17.

While the access status management method according to an embodiment of the present invention is described below, contents the same as those of the door opening control method according to an embodiment of the present invention, for example the opening of the door, will be omitted or briefly described.

Figure 10:
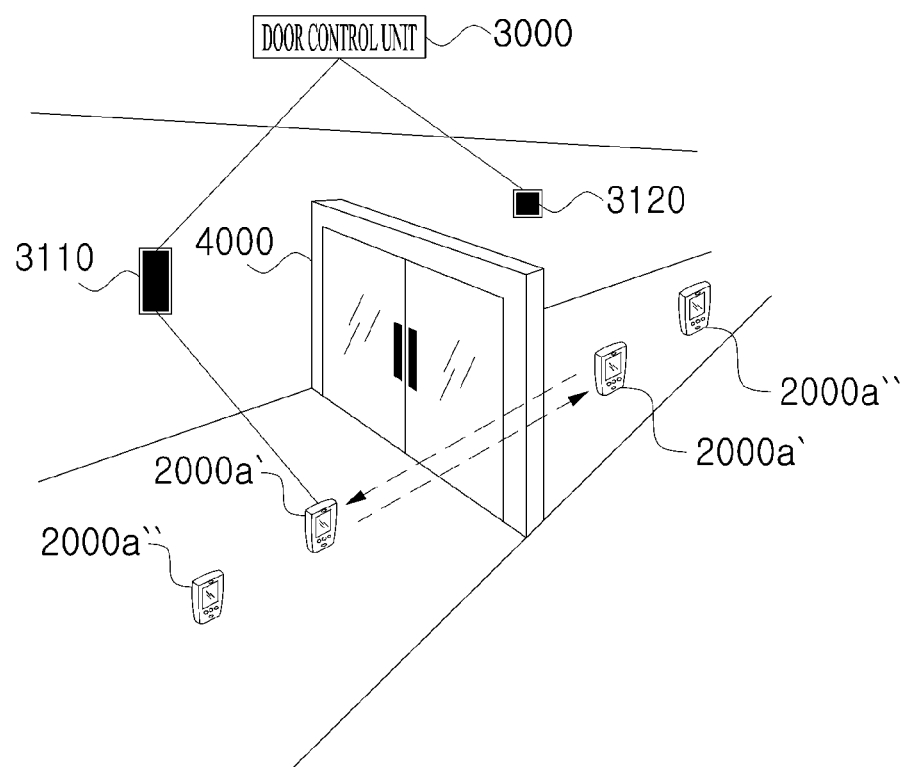
FIG. 10 is a surrounding view of an access status management method according to an embodiment of the present invention.

FIG. 10 is a surrounding view of the access status management method according to an embodiment of the present invention.

As shown in FIG. 10, a first door communication unit 3110 may be provided at an inner side with respect to a door 4000, and a second door communication unit 3120 may be provided at an outer side with respect to the door 4000.

Also, shown in FIG. 10, the first door communication unit 3110 and the second door communication unit 3120 may be connected to a door control unit 3700.

The arrangement environment of the first door communication unit 3110 and the second door communication unit 3120 shown in FIG. 10 are only examples for convenience of description, and the present invention is not limited thereto. Depending on the selection, the locations of the first door communication unit 3110 and the second door communication unit 3120 may be changed, only one of the first door communication unit 3110 and the second door communication unit 3120 may be provided, and also an additional element such as a third door communication unit may be further provided.

Also, depending on the operating environment, separate door operating devices 3000 may be provided at the inner side and the outer side. For example, the first door operating device 3000a may be provided at the outer side, and the second door operating device 3000b may be provided at the inner side.

Also, depending on the operating environment, a single door communication unit 3100 that is responsible for the inner side and the outer side may be provided. In this case, the door communication unit 3100 may detect a distance from the user terminal 2000a and a direction of the user terminal 2000a to determine whether the user enters the inner side from the outer side or exits the inner side to the outer side.

For convenience of description, the access status management method of the present invention and its modifications will be described below with reference to the installation environment of FIG. 10.

In the following description with reference to FIG. 10, management of whether an authorized user uses the access control system may be a very important issue.

For example, when a plurality of users intend to pass through a door 4000 in an automated access control system, a user of a first user terminal 2000a' may be authorized by using an authentication token and then may pass through the door 4000, but a user of a second user terminal 2000a" may pass through the door 4000 that is opened by the user of the first user terminal 2000a' without determination of access authority. In this case, a history of the user of the second user terminal 2000a" passing through the door 4000 may not be managed.

In order for the access status management method according to an embodiment of the present invention to prevent such a problem, access status information may be additionally included, and thus it is possible to determine whether there is an abnormal access on the basis of the access status information and also possible to refuse the abnormal access. For example, when a user passes through the door by means of access authentication, the user's access status is changed from an entry state to an exit state. When the user intends to exit, the door operating device 3000 may open the door 4000 so that the user can pass as long as the user has authority because the access status of the user is normal.

On the other hand, when a user has passed without access authentication, the user's access status is maintained at the entry state. When the user intends to exit, the door operating device 3000 may refuse to open the door 4000 even though the user is authorized because the access status is not normal. According to some embodiments of the present invention, the user has to request the authentication server 1000 to reissue the access status, and thus it is possible for the authentication server 1000 to independently manage the access status.

The access status management method according to an embodiment of the present invention and its modifications will be described below with reference to FIGS. 11 to 17.

Figure 11:
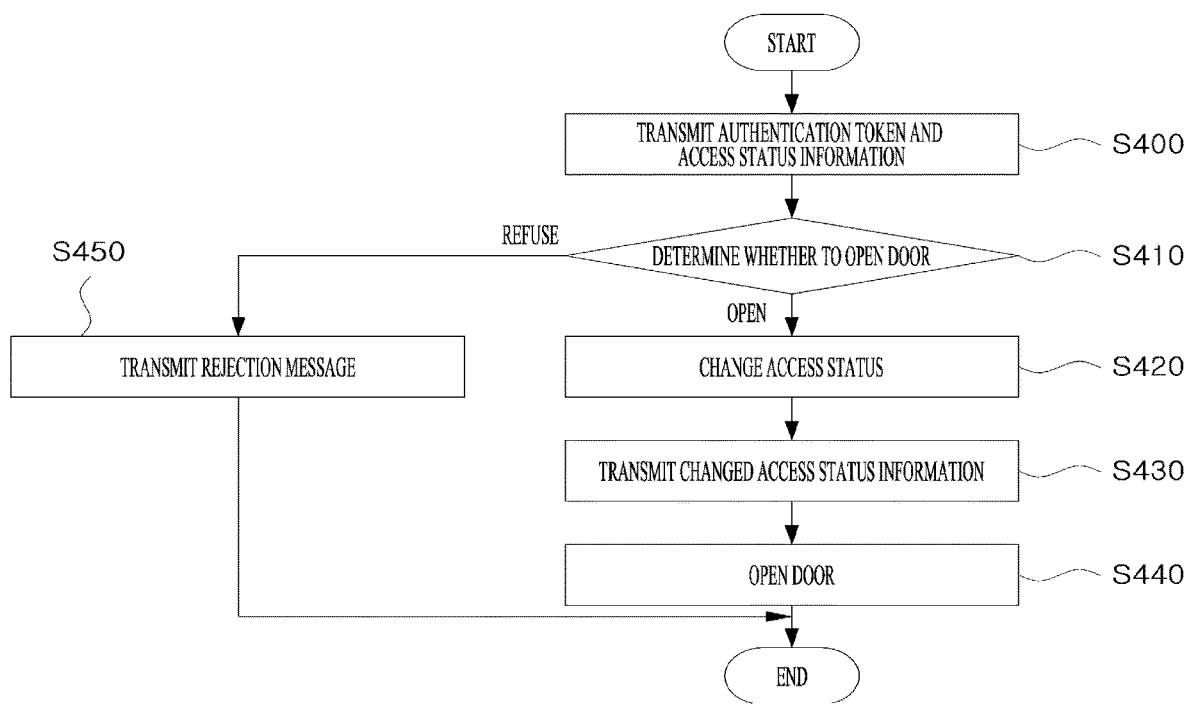
FIG. 11 is a flowchart showing an access status management method according to an embodiment of the present invention.

FIG. 11 is a flowchart showing an access status management method according to an embodiment of the present invention.

Referring to FIG. 11, the access status management method may include transmitting an authentication token and access status information (S400), determining whether to open a door (S410), changing the access status information (S420), transmitting the changed access status information (S430), opening the door (S440), and transmitting a rejection message (S450).

According to some embodiments of the present invention, the transmission of authentication token and first access status information to a first door communication unit 3110 may be performed by a user terminal 2000*a* (S400).

When communication is established between the user terminal 2000*a* and the first door communication unit 3110, the user terminal 2000*a* may transmit a prestored authentication token and first access status information to the first door communication unit 3110. The communication being established between the user terminal 2000*a* and the first door communication unit 3110 may denote that the user terminal 2000*a* establishes communication with the door operating device 3000.

The user terminal 2000*a* may automatically transmit the prestored authentication token and the first access status information to the first door communication unit 3110 even without a separate user request.

Alternatively, the user terminal 2000*a* may transmit the prestored authentication token and the first access status information to the first door communication unit 3110 even when a user request is input. For example, the user terminal 2000*a* may issue a notification that the communication with the first door communication unit 3110 has been established. When an authentication token transmission request is input from the user while the communication with the first door communication unit 3110 is established, the user terminal 2000*a* may transmit the prestored authentication token and the first access status information to the first door communication unit 3110. As another example, when the communication with the first door communication unit 3110 is established while the authentication token transmission request is input from the user, the user terminal 2000*a* may transmit the prestored authentication token and the first access status information to the first door communication unit 3110. However, in order to determine the user's cancellation intent due to a false input and a change in situation, when the user terminal 2000*a* is not connected to the first door communication unit 3110 within a predetermined amount time from a time when the authentication token transmission request is input, the user terminal 2000*a* may determine that the user has a cancellation intent and may cancel the authentication token transmission request. When the authentication token transmission request is cancelled, the user terminal 2000*a* may not transmit a prestored authentication token to the first door communication unit 3110 even though the user terminal 2000*a* is connected to the first door communication unit 3110.

The above-described prestored authentication token to be transmitted may refer to at least one authentication token stored in the user terminal 2000*a*.

Also, according to some embodiments of the present invention, the determination of whether to open a door may be performed (S410).

The door control unit 3700 may acquire the authentication token and the access status information through the first door communication unit 3110.

The door control unit 3700 may determine whether to open a door on the basis of the access status information and authority included in the authentication token.

The door control unit 3700 may determine whether door identification information corresponding to the door operating device 3000 and/or the door 4000 is included in the authentication token. When the door identification information corresponding to the door operating device 3000 and/or the door 4000 is included in the authentication token, the door control unit 3700 may determine that the authentication has authority.

The door control unit 3700 may determine whether the authentication token has authority in consideration of the door identification information and an authority value.

The door control unit 3700 may determine whether door authority corresponding to the door operating device 3000 and/or the door 4000 is included in the authentication token.

The door control unit 3700 may determine whether door identification information corresponding to the door operating device 3000 and/or the door 4000 is included in the authentication token. Also, the door control unit 3700 may determine whether authority included in authentication information corresponding to the door identification information is authority to pass through the door.

The door control unit 3700 may determine whether access status information included in the authentication information is normal.

In an embodiment, the door control unit 3700 may determine whether an access status included in the access status information is a state corresponding to the first door communication unit 3110.

When the authentication token is authorized and also the access status information included in the authentication information corresponds to the first door communication unit 3110, the door control unit 3700 may determine that the door will be opened. For example, when the access status information indicates an entry state while the first door communication unit 3110 is installed at the outer side with respect to the door, the door control unit 3700 may determine that the access status information corresponds to the first door communication unit 3110.

The door control unit 3700 may determine whether to open the door on the basis of various additional determination criteria, in addition to the authority determination based on the authentication token and also whether the access status information is normal.

According to some embodiments of the present invention, the door control unit 3700 may determine whether to open the door in further consideration of the number of users who are allowed to enter a space.

The door control unit 3700 may calculate the current number of users who have entered the space. The door control unit 3700 may calculate the current number of users who have entered, which is equal to the number of users who have entered minus the number of users who have exited. For example, the door control unit 3700 may calculate the number of users who have entered by subtracting the number of users having an access status of an exit state when the door is opened from the number of users having an access status of as entry state when the door is opened.

When the number of users who have entered is greater than or equal to a predetermined maximum number of allowable users, the door control unit 3700 may determine that the opening of the door is not allowed.

Also, according to some embodiments of the present invention, the change of the access status information may be performed (S420).

When it is determined the door will be opened, the door control unit 3700 may change the access status information.

For example, when authority to pass through the door is included in the authentication token and it is determined that the access status information is normal, the door control unit 3700 may change the access status information. As a more detailed example, when the access status information indicates an entry state, the door control unit 3700 may change the access status information to an exit state.

Also, according to some embodiments of the present invention, the transmission of the changed access status information may be performed (S430).

The door control unit 3700 may execute control so that the access status information can be transmitted to the user terminal 2000*a*.

Also, the door control unit 3700 may execute control so that the opening determination result can be transmitted to the user terminal 2000*a*.

When the result of the authority determination is that the authentication has authority, the door control unit 3700 may transmit permission information indicating that it has been determined that the authentication token has authority to the user terminal 2000*a*. Also, the door control unit 3700 may inform that it has been determined that the authentication token has authority by outputting at least one of auditory information and visual information through a separate output unit.

Also, when the result of the determination for the opening is that the authentication token has no authority to open the door 4000, the door control unit 3700 may execute control so that a message indicating that the opening of the door 4000 is not allowed can be transmitted to the user terminal 2000*a*.

Also, according to some embodiments of the present invention, the opening of the door may be performed (S440).

When it is determined that the authentication token includes authority to open the door 4000, the door control unit 3700 may control the door driving unit 3600 so that the door leaf can be unlocked.

The door driving unit 3600 may provide power so that the door leaf can be unlocked. Also, when the door 4000 is an automatic door, the door control unit 3700 may control the door driving unit 3600 so that the door leaf can be opened. In this case, the door driving unit 3600 may provide power so that the door leaf can be opened.

After the door leaf is unlocked, the door control unit 3700 may control the door driving unit 3600 so that the door leaf can be locked on the basis of a locking condition. The door control unit 3700 may determine whether the door leaf is closed again on the basis of a signal acquired from a door sensor unit 3400. When the door leaf is closed again, the door control unit 3700 may control the door driving unit 3600 to provide power so that the door leaf can be locked. Also, the door control unit 3700 may control the door driving unit 3600 in further consideration of a locking standby time so that the door leaf can be locked after the locking standby time even though the door leaf has been closed again.

Also, according to some embodiments of the present invention, the transmission of a rejection message may be performed when a result of determining whether to open the door indicates rejection (S450).

The door control unit 3700 may execute control so that an opening rejection message can be transmitted to the user terminal 2000*a* when the result of determining whether to open the door indicates rejection.

The opening rejection message may be a message indicating that the opening of the door is not allowed.

The opening rejection message may additionally include an opening rejection reason. For example, the opening rejection message may include opening rejection reasons such as no authority, an invalid authentication token, an expired authentication token, an abnormal access status, and the maximum allowable number of users having been exceeded.

In the above-described access status management method according to an embodiment of the present invention, the user terminal 2000*a* may provide unchanged access status information to the door operating device 3000, and the door operating device 3000 may determine whether to open the door and open the door when it is determined that the door will be opened. In this case, when the user terminal 2000*a* may transmit changed access status information to the first door communication unit 3110 without passing through the opened door, the door control unit 3700 may refuse to open the door, unlike in the case where the opening of the door is allowed on the basis of the unchanged access status information.

Also, for convenience of description, the authentication token being transmitted through the first door communication unit 3110 has been described on with an assumed entry state, but the present invention is not limited thereto and may be implemented in various ways depending on the installation environment. For example, during the exit state, the access status management method may be performed by transmitting the authentication token through the second door communication unit 3120.

The access state management method according to an embodiment of the present invention may be variously modified and provided.

Modifications of the access status management method will be described below with reference to FIGS. 12 to 17.

While the modifications of the access status management method are described below, the same numerals will be used for elements and steps the same as those of the above-described access status management method, and steps the same as those of the above-described access status management method will be omitted.

4.2.1. Access Status Management Method—First Modification

Figure 12:
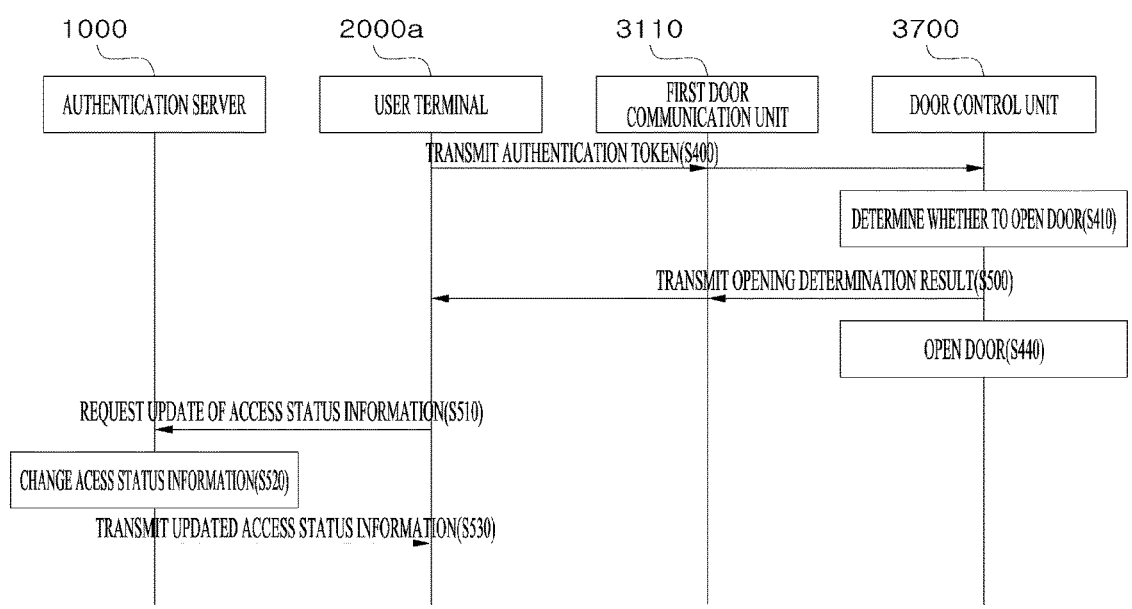
FIG. 12 is a sequence chart showing a first modification of the access status management method according to an embodiment of the present invention.

FIG. 12 is a sequence chart showing the first modification of the access status management method according to an embodiment of the present invention.

Referring to FIG. 12, the first modification of the access status management method may include transmitting an authentication token (S400), determining whether to open a door (S410), transmitting opening determination result information (S500), opening the door (S440), making a request to update access status information (S510), an authentication server 1000 changing the access status information (S520), and transmitting the updated access status information (S530).

According to some embodiments of the present invention, the transmission of an authentication token to a first door communication unit 3110 may be performed by a user terminal 2000*a* (S400).

Also, according to some embodiments of the present invention, the determination of whether to open a door may be performed by the door control unit 3700 (S410).

Also, according to some embodiments of the present invention, the execution of control so that opening determination result information can be transmitted may be performed by the door control unit 3700 (S500).

When it is determined that authority is included in the authentication token and the access status is normal, the door control unit 3700 may execute control so that information indicating that it is permitted to open the door can be transmitted to the user terminal 2000*a*.

Alternatively, when it is determined that authority is not included in the authentication token or the access status is not normal, the door control unit 3700 may execute control so that information indicating that the opening of the door has been rejected can be transmitted to the user terminal 2000*a*.

Also, the door control unit 3700 may execute control so that the access status information can be transmitted to the user terminal 2000*a*.

Also, the door control unit 3700 may execute control so that the authentication token can be transmitted to the user terminal 2000*a*.

Also, according to some embodiments of the present invention, the opening of the door may be performed (S440).

Also, according to some embodiments of the present invention, the user terminal 2000*a* may request the authentication server 1000 to update the access status information (S510).

When the user terminal 2000*a* receives information indicating that it is permitted to open the door from the door operating device 3000, the user terminal 2000*a* may request the authentication server 1000 to update the access status information.

The user terminal 2000*a* may transmit identification information of the door which is allowed to be open, information indicating that the opening of the door is allowed, and the access status information to the authentication server 1000 in order to request the authentication server 1000 to update the access state information.

Also, according to some embodiments of the present invention, the authentication server 1000 may change an access status of the received access status information (S520).

The authentication server 1000 may update the access state included in the received access status information.

The authentication server 1000 may transmit the updated access status to the user terminal 2000*a*. For example, when the access status indicates an entry state, the authentication server 1000 may update the access status with an exit state. As another example, when the access status indicates an exit state, the authentication server 1000 may update the access status with an entry state.

Also, according to some embodiments of the present invention, the authentication server 1000 may transmit the updated access status information to the user terminal 2000*a* (S530).

Depending on the situation, various additional functions may be added to the above-described first modification of the access status management method. The first modification of the access status management method may determine whether a user has entered a specific space on the basis of identification information of a door that is allowed to be opened, which is acquired from the user terminal 2000*a*.

According to some embodiments of the present invention, the authentication server 1000 may determine whether all users have been evacuated to an assembly point upon occurrence of an emergency such as a fire. The authentication server 1000 may determine whether a user has entered a predetermined assembly point on the basis of the identification information of the door that is allowed to be opened, which is acquired from the user terminal 2000*a*.

Also, the authentication server 1000 may transmit an evacuation notification to a user terminal 2000*a* of a user who has not entered the predetermined assembly point among users who are registered or users who receive the authentication token. Also, the authentication server 1000 may transmit information for providing guidance to the location of the predetermined assembly point to a user terminal 2000*a* of a user who has not entered the predetermined assembly point among users who are registered or users who receive the authentication token.

4.2.2. Access Status Management Method—Second Modification

Figure 13:
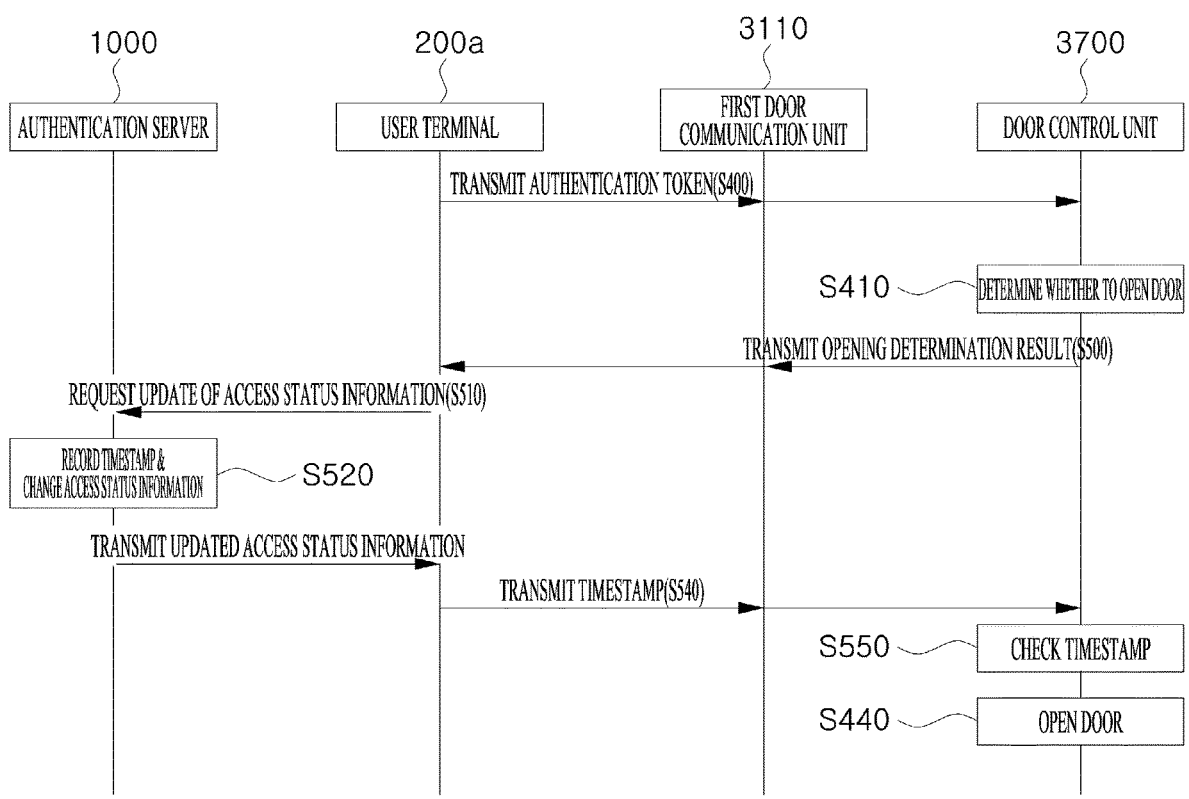
FIG. 13 is a sequence chart showing a second modification of the access status management method according to an embodiment of the present invention.

FIG. 13 is a sequence chart showing the second modification of the access status management method according to an embodiment of the present invention.

Referring to FIG. 13, the second modification of the access status management method may include transmitting an authentication token (S400), determining whether to open a door (S410), transmitting opening determination result information (S500), making a request to update access status information (S510), an authentication server 1000 changing a timestamp record and access status information (S520), transmitting the updated access status information (S530), transmitting a timestamp (S540), checking the timestamp (S550), and opening the door (S440).

According to some embodiments of the present invention, an authentication token may be transmitted (S400).

According to some embodiments of the present invention, the determination of whether to open a door may be performed (S410).

According to some embodiments of the present invention, the transmission of opening determination result information may be performed (S500).

According to some embodiments of the present invention, the making of a request to update access status information may be performed (S510).

According to some embodiments of the present invention, the change of a timestamp record and access status information may be performed by the authentication server 1000 (S520).

The authentication server 1000 may record a timestamp to at least one of the authentication token and access status information.

The authentication server 1000 may record a timestamp on the basis of at least one of a time at which information indicating that the door is allowed to be opened is acquired, a time at which access status information of which updating is requested, and a current time.

According to some embodiments of the present invention, the transmission of the updated access status information may be performed (S530).

The authentication server 1000 may transmit the updated access status information to the user terminal 2000*a*. Also, when the authentication token is acquired from the user terminal 2000*a*, the authentication server 1000 may transmit the authentication token to the user terminal 2000*a*. Also, when the timestamp is recorded to the authentication token, the authentication server 1000 may transmit the updated authentication token to which the timestamp is recorded to the user terminal 2000*a*.

Also, the authentication server 1000 may transmit the access status information and the timestamp separately and independently.

According to some embodiments of the present invention, the transmission of a timestamp may be performed (S540).

The user terminal 2000*a* may transmit the timestamp to a door operating device 3000. For example, as shown in FIG. 13, the user terminal 2000*a* may transmit the timestamp to a first door communication unit 3110.

The user terminal 2000*a* may transmit an independently provided timestamp to the door operating device 3000.

Alternatively, when the timestamp is included in the access status information, the user terminal 2000*a* may transmit the access status information to the door operating device 3000 to transmit the timestamp to the door operating device 3000.

Alternatively, when the timestamp is included in the authentication token, the user terminal 2000*a* may transmit the authentication token to the door operating device 3000 to transmit the timestamp to the door operating device 3000.

According to some embodiments of the present invention, the checking of the timestamp may be performed (S550).

A door control unit 3700 may check the timestamp.

The door control unit 3700 may check whether the timestamp has been acquired from the user terminal 2000*a*. For example, the door control unit 3700 may check whether an independent timestamp has been acquired from the user terminal 2000*a*. As another example, the door control unit 3700 may check whether the timestamp is included in at least one of the authentication token and the access status information acquired from the user terminal 2000*a*.

The door control unit 3700 may check whether the period of the timestamp is valid.

For example, the door control unit 3700 may check whether the time of the timestamp is a time at which or after which the opening determination result was transmitted. When the time of the timestamp is a time at which or after which the opening determination result was transmitted, the door control unit 3700 may determine whether the time of the timestamp is valid.

When a result of checking the timestamp is that there is no error, the door control unit 3700 may execute control so that the door can be opened.

According to some embodiments of the present invention, the opening of the door may be performed (S440).

The above-described timestamp may be modified in various forms. For example, the timestamp may be provided as a certificate, an electronic signature, a security key, or the like.

4.2.3. Access Status Management Method—Third Modification

Figure 14:
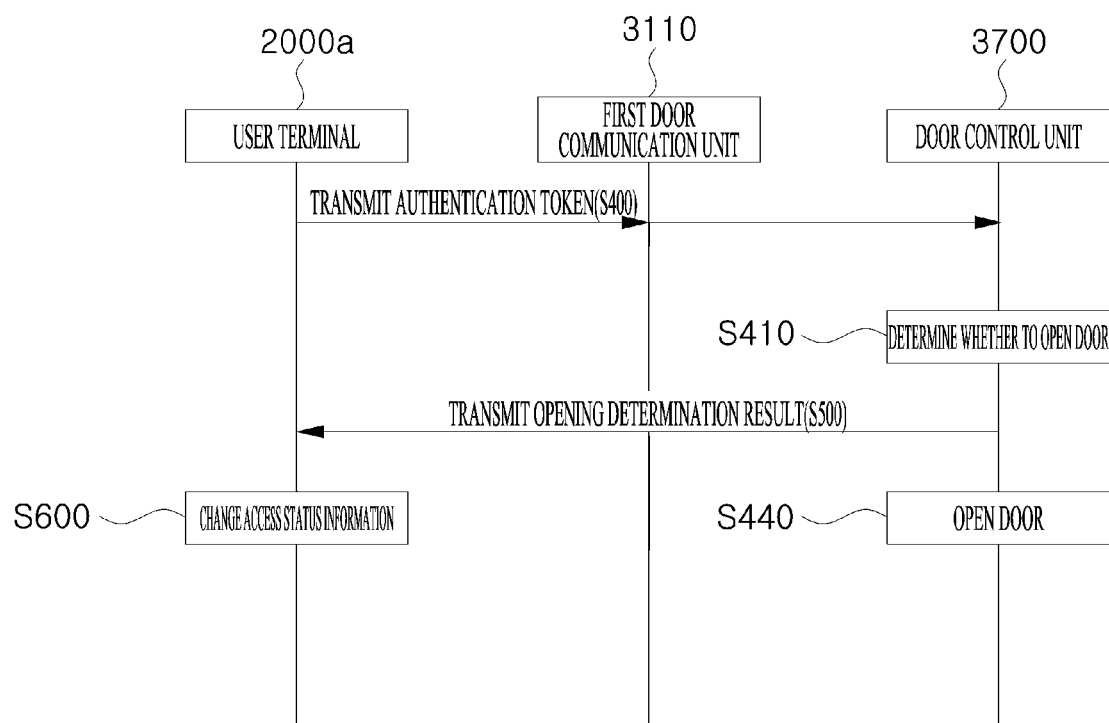
FIG. 14 is a sequence chart showing a third modification of the access status management method according to an embodiment of the present invention.

FIG. 14 is a sequence chart showing the third modification of the access status management method according to an embodiment of the present invention.

Referring to FIG. 14, the third modification of the access status management method may include transmitting an authentication token (S400), determining whether to open a door (S410), transmitting a result of the determination for the opening by a door operating device 3000 (S500), opening the door (S440), and a user terminal 2000*a* changing access status information (S600).

According to some embodiments of the present invention, the transmission of an authentication token to a first door communication unit 3110 may be performed by the user terminal 2000*a* (S400).

Also, according to some embodiments of the present invention, the determination of whether to open a door may be performed (S410).

Also, according to some embodiments of the present invention, the transmission of a result of the determination for the opening may be performed (S500).

The door control unit 3700 may execute control so that information indicating that the door is allowed to be opened can be transmitted to the user terminal 2000*a*.

Alternatively, the door control unit 3700 may execute control so that information indicating that the opening of the door has been rejected can be transmitted.

Also, the door control unit 3700 may execute control so that the access status information can be transmitted to the user terminal 2000*a*.

Also, according to some embodiments of the present invention, the opening of the door may be performed (S440).

Also, according to some embodiments of the present invention, the update of an access status may be performed by the user terminal 2000*a* (S600).

The user terminal 2000*a* may receive access status information and update the received access status information.

The user terminal 2000*a* may update the received access status information and store the updated access status information. For example, when the access status indicates an entry state, the user terminal 2000*a* may update the access status with an exit state and store the updated access status. As another example, when the access status is an exit state, the user terminal 2000*a* may update the access status with an entry state and store the updated access status.

4.2.4. Access Status Management Method—Fourth Modification

The fourth modification of the access status management method according to an embodiment of the present invention will be described below with reference to FIG. 15.

The fourth modification of the access status management method according to an embodiment of the present invention may be an embodiment in which when access status information is abnormal and thus the opening of a door is rejected, and the authentication server 1000 is requested to reissue the access status information.

Figure 15:
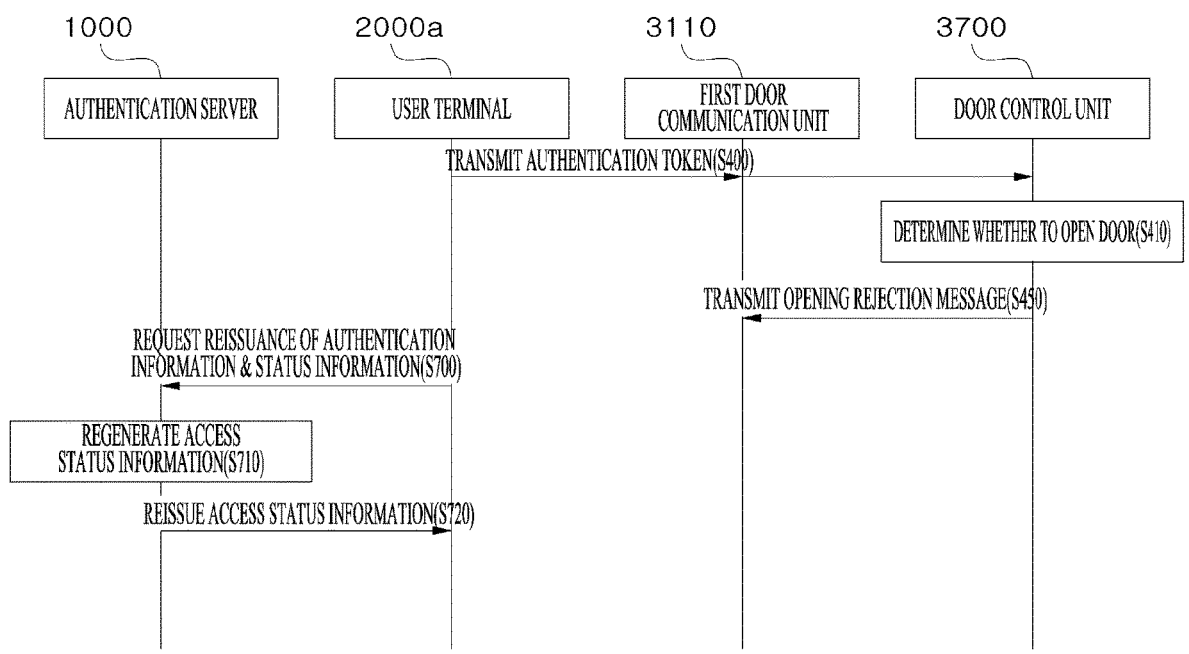
FIG. 15 is a sequence chart showing a fourth modification of the access status management method according to an embodiment of the present invention.

FIG. 15 is a sequence chart showing the fourth modification of the access status management method according to an embodiment of the present invention.

Referring to FIG. 15, the fourth modification of the access status management method may include transmitting an authentication token (S400), determining whether to open a door (S410), transmitting an opening rejection message (S450), a user terminal 2000*a* transmitting authentication information and access status information to an authentication server 1000 in order to request the authentication server 1000 to update the access status information (S700), the authentication server 1000 updating access status information (S710), and the authentication server 1000 reissuing the access status information to the user terminal 2000*a* (S720).

According to some embodiments of the present invention, the transmission of an authentication token to a first door communication unit 3110 may be performed by the user terminal 2000*a* (S400).

Also, according to some embodiments of the present invention, the determination of whether to open a door may be performed by the door operating device 3000 (S410).

Also, according to some embodiments of the present invention, the transmission of an opening rejection message may be performed by the door operating device 3000 (S450).

When the access status information does not correspond to the first door communication unit 3110, the door control unit 3700 may determine that an access status is abnormal and may transmit the opening rejection message to the user terminal 2000*a*.

Also, according to some embodiments of the present invention, the transmission of authentication information and access status information to the authentication server 1000 to request the authentication server 1000 to reissue the access status information may be performed by the user terminal 2000*a* (S700).

The user terminal 2000*a* may transmit the authentication information and the access status information to the authentication server 1000. Here, the authentication information may include at least one of user information, user identification information, a security key, and an authentication token.

Also, the user terminal 2000a does not necessarily have to transmit the authentication information and the access status information to the authentication server 1000 to request the authentication server 1000 to reissue the access status information. The user terminal 2000a may transmit at least one of the authentication information and the access status information to request the authentication server 1000 to reissue the access status information.

Also, when the access status information is included in the authentication token, the transmission of the access status information to the authentication server 1000 by the user terminal 2000a may denote that the user terminal 2000a transmits the authentication token to the authentication server 1000.

Also, when the access status information is implemented separately from the authentication token, the transmission of the access status information to the authentication server 1000 by the user terminal 2000a may denote transmission of only the access status information.

Also, according to some embodiments of the present invention, the regeneration of access status information may be performed by the authentication server 1000 (S710).

The authentication server 1000 may change the access status information after the authentication is performed on the basis of the acquired authentication information.

When a result of the user authentication is that the user is authorized, the authentication server 1000 may change the access status information to regenerate the access status information. For example, when an access status of the received access status information is an entry state, the authentication server 1000 may change the access status to an exit state.

Also, the authentication server 1000 may change the access status to a state requested by the user terminal 2000a. For example, when the access status of which change to the entry state has been requested by the user terminal 2000a, the authentication server 1000 may change the access status of the access status information to the entry state.

Also, according to some embodiments of the present invention, the reissuance of the access status information to the user terminal 2000a may be performed by the authentication server 1000 (S720).

The authentication server 1000 may reissue the access status information to the user terminal 2000a by transmitting the regenerated access status information. Also, the authentication server 1000 may store a change history.

4.2.5. Access Status Management Method—Fifth Modification

The fifth modification of the access status management method according to an embodiment of the present invention will be described below with reference to FIG. 16.

The fifth modification of the access status management method according to an embodiment of the present invention may be an embodiment for managing whether a user has actually passed.

For example, an entering user may transmit an authentication token to a first door communication unit 3110 installed at the outer side, enter the inner side after the door is opened, and acquire access status information having a changed access status from a second door communication unit 3120 installed at the inner side. Thus, it is possible for only a user who has actually passed to acquire access status information having a changed access status.

Figure 16:
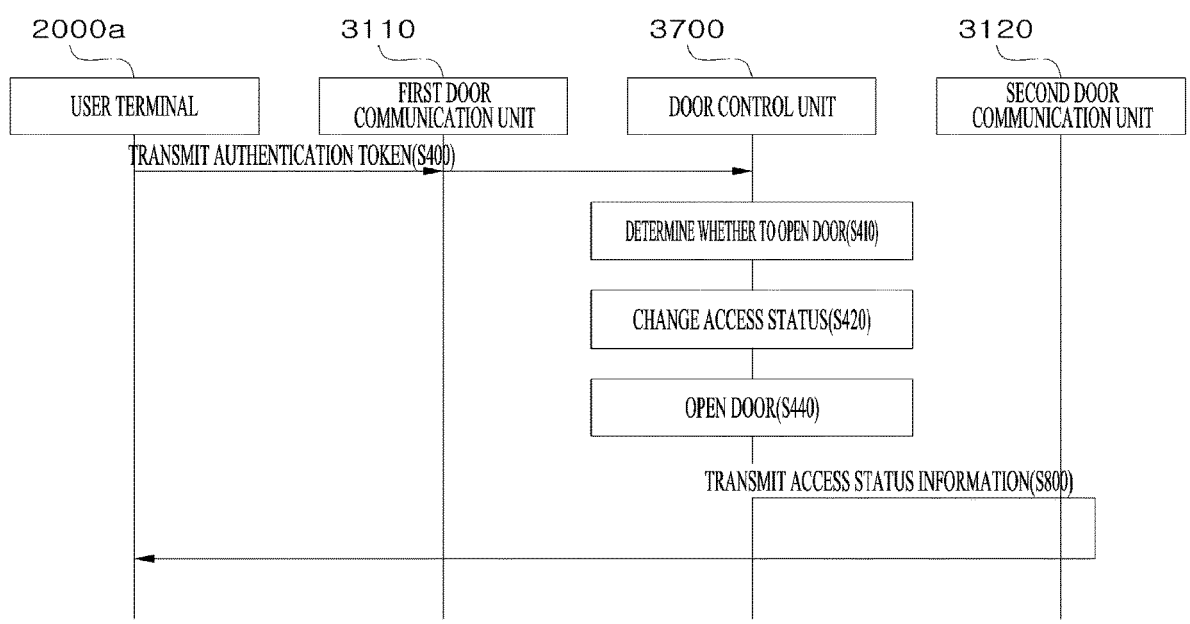
FIG. 16 is a sequence chart showing a fifth modification of the access status management method according to an embodiment of the present invention.

FIG. 16 is a sequence chart showing the fifth modification of the access status management method according to an embodiment of the present invention.

Referring to FIG. 16, the fifth modification of the access status management method may include transmitting an authentication token (S400), determining whether to open a door (S410), changing an access status (S420), opening the door (S440), and the second door communication unit 3120 transmitting access status information (S800).

According to some embodiments of the present invention, the transmission of an authentication token to the first door communication unit 3110 may be performed by the user terminal 2000a (S400).

Also, according to some embodiments of the present invention, the determination of whether to open a door may be performed by a door control unit 3700 (S410).

Also, according to some embodiments of the present invention, the change of the access status information may be performed (S420).

Also, according to some embodiments of the present invention, the opening of the door may be performed (S440).

Also, according to some embodiments of the present invention, the transmission of access status information may be performed by the second door communication unit 3120 (S440).

The door control unit 3700 may execute control so that the second door communication unit 3120 transmits the access status information to the user terminal 2000a.

When communication between the second door communication unit 3120 and the user terminal 2000a is established, the door control unit 3700 may execute control so that the second door communication unit 3120 transmits the access status information to the user terminal 2000a.

When the communication between the second door communication unit 3120 and the user terminal 2000a is not established within a predetermined time from at least one of an authentication token reception time point, a door opening determination time point, an access status change time point, and a door opening time point, the door control unit 3700 may cancel the transmission of the access status information.

4.2.6. Access Status Management Method—Sixth Modification

The sixth modification of the access status management method according to an embodiment of the present invention will be described below with reference to FIGS. 17 and 18.

The sixth modification may be an embodiment in which a door is provided in a hierarchical structure.

Figure 17:
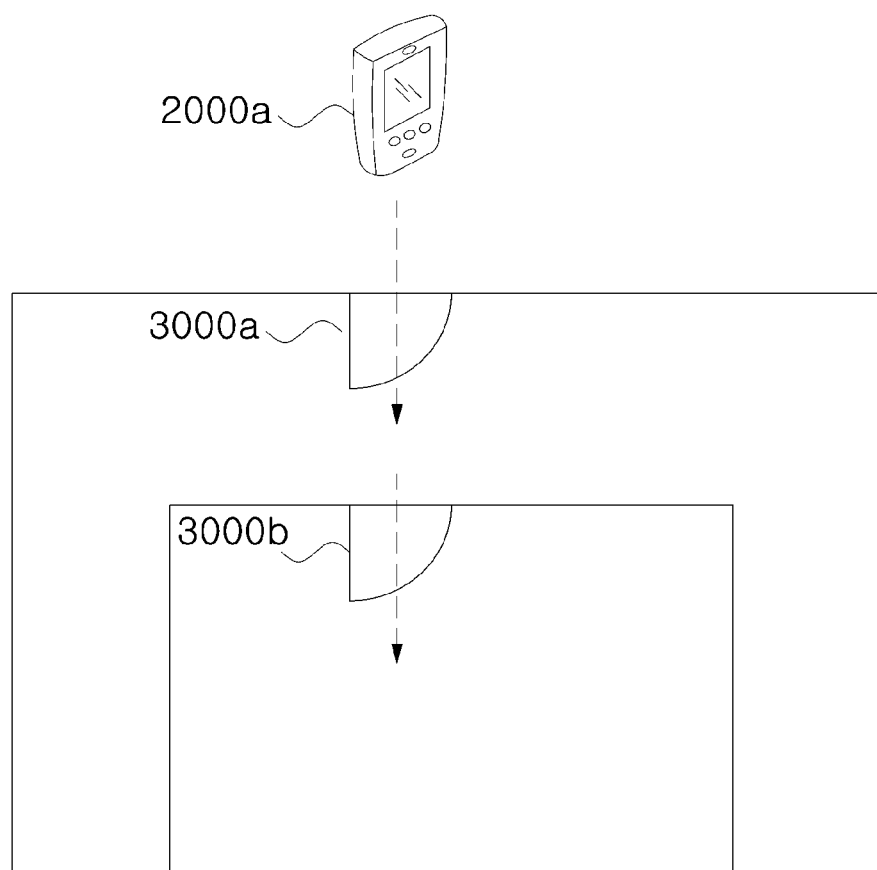
FIG. 17 is a surrounding view of a door with a hierarchical structure according to a sixth modification of the present invention.

FIG. 17 is a surrounding view of a door with a hierarchical structure according to the sixth modification of the present invention.

As shown in FIG. 17, a space separated by a single door may include a separate inner space. In FIG. 13, a first door operating device 3000a may be provided at a first door 4000a for separating a first inner space from an outer space, and a second door operating device 3000b may be provided at a second door 4000b for separating a second inner space from the first inner space.

Accordingly, it is preferable that state information of such an inner space and a high-ranked space be separately managed.

The sixth modification of the access status management method will be described below with reference to FIG. 18.

Figure 18:
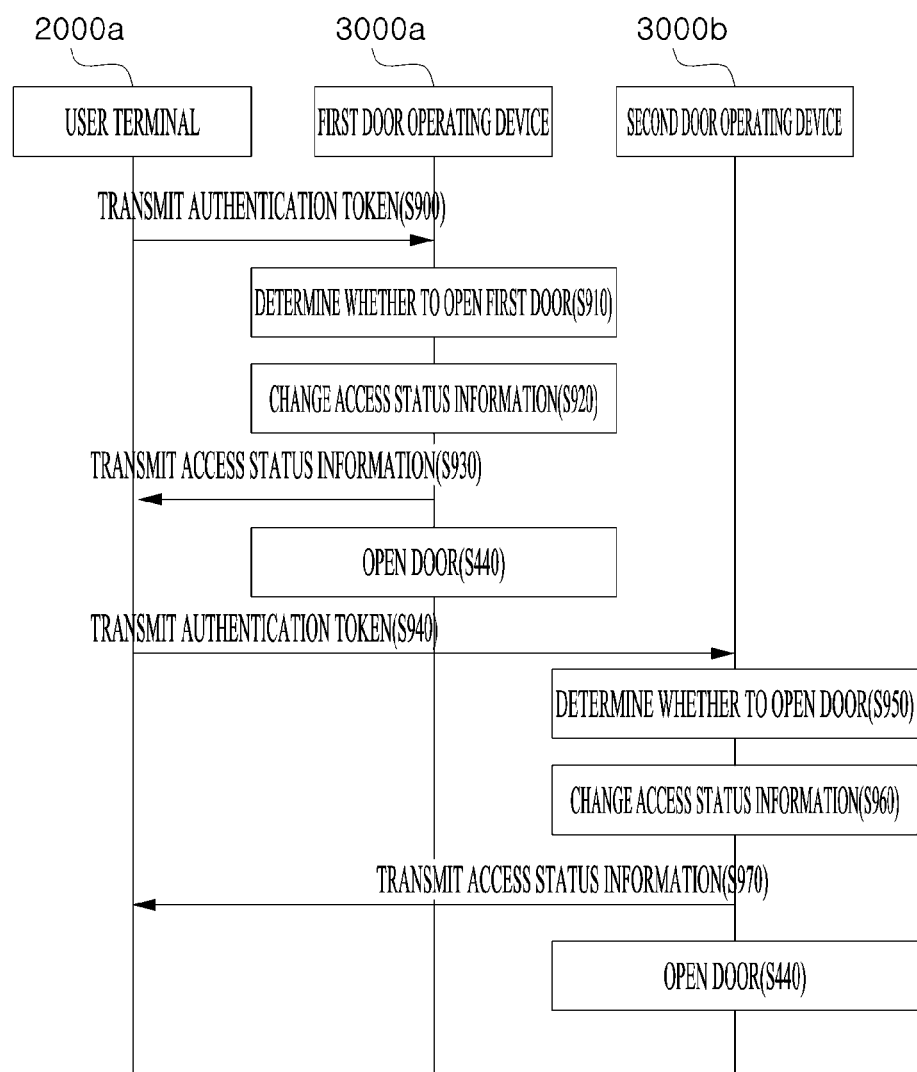
FIG. 18 is a sequence chart showing the sixth modification of the access status management method according to an embodiment of the present invention.

FIG. 18 is a sequence chart showing the sixth modification of the access status management method according to an embodiment of the present invention.

Referring to FIG. 18, the sixth modification of the access status management method may include a user terminal 2000*a* transmitting an authentication token to a first door operating device 3000*a* (S900), the first door operating device 3000*a* determining whether to open a door (S910), the first door operating device 3000*a* changing access status information (S920), the first door operating device 3000*a* transmitting the access status information (S930), opening a first door 4000*a* (S440), the first door operating device 3000*a* transmitting an authentication token to a second door operating device 3000*b* (S940), the second door operating device 3000*b* determining whether to open a door (S950), the second door operating device 3000*b* changing access status information (S960), the second door operating device 3000*b* transmitting the access status information (S970), and opening a second door 4000*b* (S440).

According to some embodiments of the present invention, the transmission of an authentication token to the first door operating device 3000*a* may be performed by the user terminal 2000*a* (S900).

Also, according to some embodiments of the present invention, the determination of whether to open a door may be performed by the first door operating device 3000*a* (S910).

The first door operating device 3000*a* may determine whether to open a door on the basis of access status information and authority included in the authentication token.

The first door operating device 3000*a* may determine whether door identification information corresponding to the first door operating device 3000*a* is included in the authentication token. The first door operating device 3000*a* may determine whether the authentication token has authority when the door identification information corresponding to the first door operating device 3000*a* is included in the authentication token.

The first door operating device 3000*a* may determine whether an authority value for a door corresponding to the first door operating device 3000*a* is included in the authentication token.

The first door operating device 3000*a* may determine whether door identification information corresponding to the first door operating device 3000*a* is included in the authentication token. Also, the first door operating device 3000*a* may determine whether the authority value corresponding to the door identification information is an authority value for passing through the door.

The first door operating device 3000*a* may determine whether the access status information included in the authentication information is normal.

The first door operating device 3000*a* may determine whether an access status for the first door operating device 3000*a* included in the access status information corresponds to a door communication unit 3100 that has acquired the authentication token. In the following embodiment, it is assumed that the authentication token is acquired through the first door communication unit 3110 of the first door operating device 3000*a*. The first door operating device 3000*a* may determine whether the access status corresponds to the first door communication unit 3110 of the first door operating device 3000*a*.

When the authentication token is authorized and also the access status for the first door operating device 3000*a* included in the authentication information corresponds to the first door communication unit 3110 of the first door operating device 3000*a*, the first door operating device 3000*a* may determine that the door will be opened.

Also, according to some embodiments of the present invention, the change of access status information may be performed by the first door operating device 3000*a* (S920).

The first door operating device 3000*a* may change the access status to a subsequent stage. For example, when the access status is an entry state, the first door operating device 3000*a* may change the access status to an exit state.

Also, according to some embodiments of the present invention, the transmission of the access status information may be performed by the first door operating device 3000*a* (S930).

The first door operating device 3000*a* may transmit access status information having a changed access status for the first door operating device 3000*a* to the user terminal 2000*a*.

The user terminal 2000*a* may update the access status of the authentication token with the access status information acquired from the first door operating device 3000*a*. Alternatively, the user terminal 2000*a* may discard prestored access status information and may store the access status information acquired from the first door operating device 3000*a*.

Also, according to some embodiments of the present invention, the opening of a first door 4000*a* may be performed by the first door operating device 3000*a* (S440).

Also, according to some embodiments of the present invention, the transmission of an authentication token to the second door operating device 3000*b* may be performed by the user terminal 2000*a* (S940).

Also, according to some embodiments of the present invention, the determination of whether to open a door may be performed by the second door operating device 3000*b* (S950).

The second door operating device 3000*b* may determine whether to open the door on the basis of the access status information and authority included in the authentication token.

The second door operating device 3000*b* may determine whether door identification information corresponding to the second door operating device 3000*b* is included in the authentication token. When the door identification information corresponding to the second door operating device 3000*b* is included in the authentication token, the second door operating device 3000*b* may determine that the authentication token has an authority value.

The second door operating device 3000*b* may determine whether an authority value for a door corresponding to the second door operating device 3000*b* is included in the authentication token.

The second door operating device 3000*b* may determine whether door identification information corresponding to the second door operating device 3000*b* is included in the authentication token. Also, the second door operating device 3000*b* may determine whether the authority value corresponding to the door identification information is an authority value for passing through the door.

The second door operating device 3000*b* may determine whether the access status information included in the authentication information is normal.

The second door operating device 3000*b* may determine whether an access status for the second door operating device 3000*b* included in the access status information corresponds to a door communication unit 3100 that has acquired the authentication token. In the following embodiment, it is assumed that the authentication token is acquired through the first door communication unit 3110 of the second door operating device 3000*b*. The second door operating device 3000*b* may determine whether the access status corresponds to a status corresponding to the first door communication unit 3110 of the second door operating device 3000*b*.

When the authentication token is authorized and also the access status for the second door operating device 3000*b* included in the authentication information corresponds to the first door communication unit 3110 of the first door operating device 3000*a*, the second door operating device 3000*b* may determine to that the door will be opened.

Also, the second door operating device 3000*b* may determine whether to open the door in further consideration of the access status for the first door operating device 3000*a*, which is a high-ranked layer.

When the access status for the first door operating device 3000*a* is abnormal, the second door operating device 3000*b* may refuse to open the door. For example, the access status for the first door operating device 3000*a* being abnormal may denote that it has been determined that the user terminal 2000*a* has not passed through the first door operating device 3000*a*. As a more detailed example, when the user terminal 2000*a* has passed through the first door operating device 3000*a*, which is a high-ranked layer, the access status for the first door operating device 3000*a* has to be an exit state. When the access status for the first door operating device 3000*a* is an entry state, the second door operating device 3000*b* may determine that the user terminal 2000*a* has abnormally passed through the first door operating device 3000*a* and may refuse to open the door.

Also, according to some embodiments of the present invention, the change of access status information may be performed by the second door operating device 3000*b* (S960).

When it is determined to that the door will be opened, the second door operating device 3000*b* may change the access status information.

The second door operating device 3000*b* may change the access status for a subsequent stage. For example, when the access status for the second door operating device 3000*b* is an entry state, the second door operating device 3000*b* may change the access status to an exit state.

Also, according to some embodiments of the present invention, the transmission of the access status information may be performed by the second door operating device 3000*b* (S970).

Also, according to some embodiments of the present invention, the opening of a second door 4000*b* may be performed by the second door operating device 3000*b* (S440).

Although the access control through the hierarchical structure between a plurality of door operating devices has been described above as an example, the present invention is not limited thereto. The sixth modification of the access status management method according to an embodiment of the present invention may be provided as a hierarchical structure between the door operating device 3000 and an electronic device. For example, when a request is made to use an electronic device by using an authentication token, the electronic device may determine whether the user terminal 2000*a* has entered through an entrance door of a space where the electronic device is located on the basis of access status information. When a result of the determination is that the user terminal 2000*a* has entered through the entrance door of the space where the electronic device is located, the use of the electronic device may be allowed. In this embodiment, the second door operating device 3000*b* of the above-described sixth modification of the access status management method according to an embodiment of the present invention may be replaced with an electronic device, and the determination of whether to open the door, which is performed by the second door operating device 3000*b*, may be replaced with determination of whether to allow the electronic device to be used.

4.3. Forcible Authority Change Method

A forcible authority change method according to an embodiment of the present invention will be described below with reference to FIGS. 9 to 12.

Figure 19:
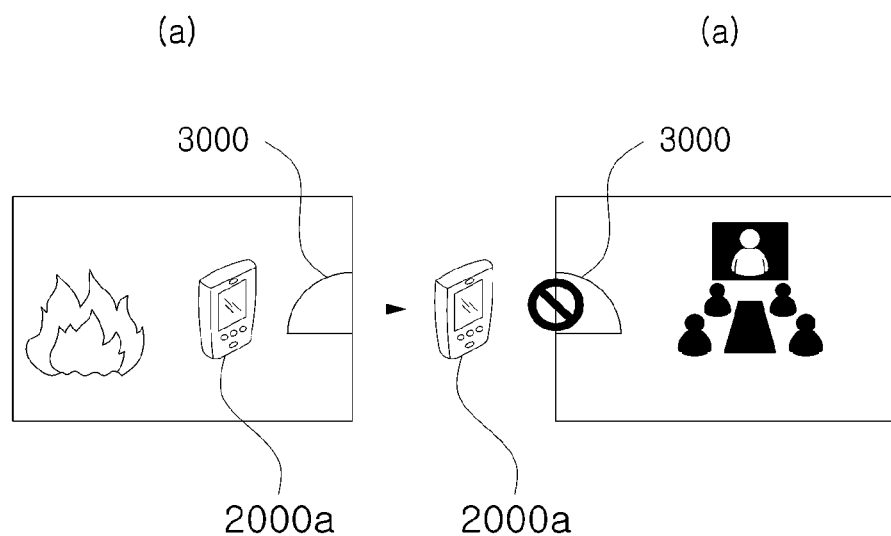
FIG. 19 is a surrounding view of a forcible authority change method according to an embodiment of the present invention.

FIG. 19 is a surrounding view of a forcible authority change method according to an embodiment of the present invention.

When the access control system 10000 is provided in a building or the like, it is normally possible to limit an accessible zone by issuing an authentication token according to assigned authority and allowing only an authorized door to be opened. However, it is preferable to exceptionally assign authority to open all doors or authority to open a door necessary for evacuation when an exceptional event such as a fire and an earthquake occurs. When a failure occurs in communication established between an access control server and an access control device in case of a fire or an earthquake, a conventional access control system may fail to open a door for evacuation. However, the access control system 10000 of the present invention can solve this problem by the authentication server 1000 issuing an authentication token that is forcibly authorized.

Also, the forcible authority change method according to an embodiment of the present invention may also be applied to a case in which the access of an authorized user is temporarily restricted due to a security conference, etc.

Figure 20:
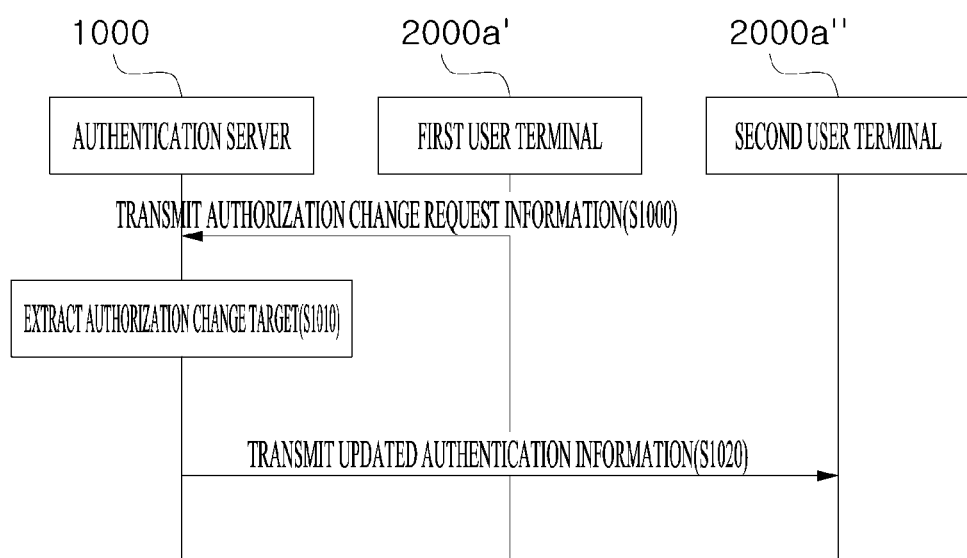
FIG. 20 is a sequence chart showing a forcible authorization change method according to an embodiment of the present invention.

FIG. 20 is a sequence chart showing a forcible authorization change method according to an embodiment of the present invention.

Referring to FIG. 20, the forcible authorization change method may include acquiring a request to change authorization (S1000), extracting a target of which authorization will be changed (S1010), and transmitting an authentication token having updated authorization to the extracted target (S1020).

According to some embodiments of the present invention, the acquisition of a request to change authorization may be performed (S1000). The request to change authorization may be provided by a user terminal 2000*a*.

The user terminal 2000*a* may acquire authorization change request information.

The authorization change request information may be information for making a request to change a user's authority. The change of authority according to the authorization change request information may denote a continuous change of authorization, but the present invention is not limited thereto. The change of authorization may denote a temporary change in which at least one of a deadline and a condition is fixed.

Here, the target of which authorization will be changed may be at least one of a user and a door 4000. When the target of which authorization will be changed is a user, the change of authorization may denote a change of authority assigned to the user. Also, when the target of which authorization will be changed is a door, the change of authorization may denote a change of authorization performed by updating an authentication token including the authority of the corresponding door.

The user terminal 2000*a* may output an authorization change graphical user interface (GUI) for acquiring the authorization change request information through a display unit.

The user terminal 2000a may acquire information regarding the target of which authorization will be changed. When the target of which authorization will be changed is a user, the user terminal 2000a may acquire information regarding the target of which authorization will be changed through at least one of selection of a user of which authorization will be changed and input of user identification information. Also, when the target of which authorization will be changed is a door, the user terminal 2000a may acquire information regarding the target of which authorization will be changed through at least one of selection of a door of which authorization will be changed and input of door identification information.

The user terminal 2000a may acquire information regarding a change history.

When the target of which authorization will be changed is a user, the user terminal 2000a may acquire a change history regarding at least a portion of the assigned authority. For example, when authority for a first door is granted to the user, the change history may include information regarding withdrawal of the authority for the first door. As another example, when the user does not have authority for the first door, the change history may include information regarding authority for the first door. As another example, the change history may include information regarding assignment of authority for the first door to only a specified user.

As described above, the change history may include information regarding changes of at least a portion of pre-assigned authority or unassigned authority.

When the target of which authorization will be changed is a door, the change history may include information regarding whether the access of the door of which authorization will be changed is forcibly restricted or allowed. For example, when the target of which authorization will be changed is a door, the change history may include information on requests made to restrict the authority for the door of which authorization will be changed. As another example, the change history may include information on requests made to forcibly allow authority for the door of which authorization will be changed.

Also, according to some embodiments of the present invention, the change history may be occurrences of predetermined exceptional events. For example, the change history may include a fire.

In this case, the change history may include the opening of all doors.

The user terminal 2000a may acquire information regarding a change condition.

The change condition may be a condition that the change will be valid.

The change condition may include a change time and a target grade.

The changed time may be information regarding a time during which a change in authorization is valid. For example, depending on the change time, the changed authorization may be valid during only a limited time. As another example, the changed authorization may be limited in validity according to the target grade.

The user terminal 2000a may transmit the authorization change request information to the authentication server 1000 in order to request the authentication server 1000 to change authorization.

Also, according to some embodiments of the present invention, when the change history is occurrences of specific events such as a fire, the change condition may be omitted.

Also, according to some embodiments of the present invention, the extraction of a target of which authorization will be changed may be performed (S1010).

The authentication server 1000 may extract a target included in the authorization change request information.

In the following description, as an example, the target included in the authorization change request information is a user. In this case, the authentication server 1000 may extract a user of which authorization will be changed. The authentication server 1000 may extract a user corresponding to user identification information included in the target of which authorization will be changed as the user of which authorization will be changed. Also, the authentication server 1000 may extract a user corresponding to a grade included in the target of which authorization will be changed as the user of which authorization will be changed.

In the following description, as an example, the target included in the authorization change request information is a door. In this case, different operations may be performed when the change history includes prevention of passage through the door and when the change history includes allowance of passage through the door.

When the change history includes prevention of passage through the door, the authentication server 1000 may extract a user authorized for the door as the target of which authorization will be changed.

Also, when the change history includes allowance of passage through the door, the authentication server 1000 may extract a user unauthorized for the door as the target of which authorization will be changed.

Also, according to some embodiments of the present invention, when the change history includes occurrence of a specific event such as a fire, the target of which authorization will be changed may be all users who are registered or all users who have received an authentication token.

Also, according to some embodiments of the present invention, the transmission of an authentication token having updated authority to the extracted target may be performed (S1020).

The authentication server 1000 may transmit an authentication having changed authorization on the basis of an authorization change history for each extracted user. For example, it is assumed that an authentication token having authority for a first door is issued to user A, which is a target included in the authorization change request information. In this case, when the authorization change history includes a request to withdraw the authority for the first door, the authentication server 1000 may transmit a new authentication token not including the authority for the first door to a user terminal 2000a of user A. Also, after receiving the new authentication token, the user terminal 2000a of user A may discard an original authentication token and replace the discarded authentication token with the new authentication token.

When a deadline and/or condition for the authorization change are canceled, the authentication server 1000 may restore the original authentication token.

For example, the authentication server 1000 may transmit the authentication token before the authorization change to the user terminal 2000a to update the new authentication token with the transmitted authentication token.

As another example, the authentication server 1000 may transmit a command to the user terminal 2000a so that the authentication token before the authorization change can be used.

The request to change the authorization is not necessarily acquired through the user terminal 2000*a*, but may be acquired from a manager terminal 2000*b*.

Also, the authentication server 1000 may acquire the authorization change request information in association with a separate system such as a fire alarm system and a disaster management system.

Also, when it is determined that an exceptional event such as a fire and a disaster has occurred in association with a separate system such as a fire alarm system and a disaster management system, the authentication server 1000 may determine that the request to change the authorization is acquired, extract a target of which authorization will be changed, and transmit updated authentication information.

When it is determined that such an exceptional event has occurred, a target to which the authentication information will be transmitted may be preset by the authentication server 1000.

Also, when an exceptional event has occurred, the door operating device 3000 may acquire a notification indicating that the exceptional event has occurred from the terminal 2000 and may determine whether the exceptional event has occurred on the basis of information included in the authentication token.

According to some embodiments of the present invention, when it is determined that the exceptional event has occurred, the door operating device 3000 may notify all connected door operating devices 3000 that the exceptional event has occurred. When the notification is received, all the door operating devices 3000 may change states of doors to enable the doors to be kept open.

The door operating device 3000 may operate in different modes in a situation in which an exceptional event occurs and in a general situation.

Figure 21:
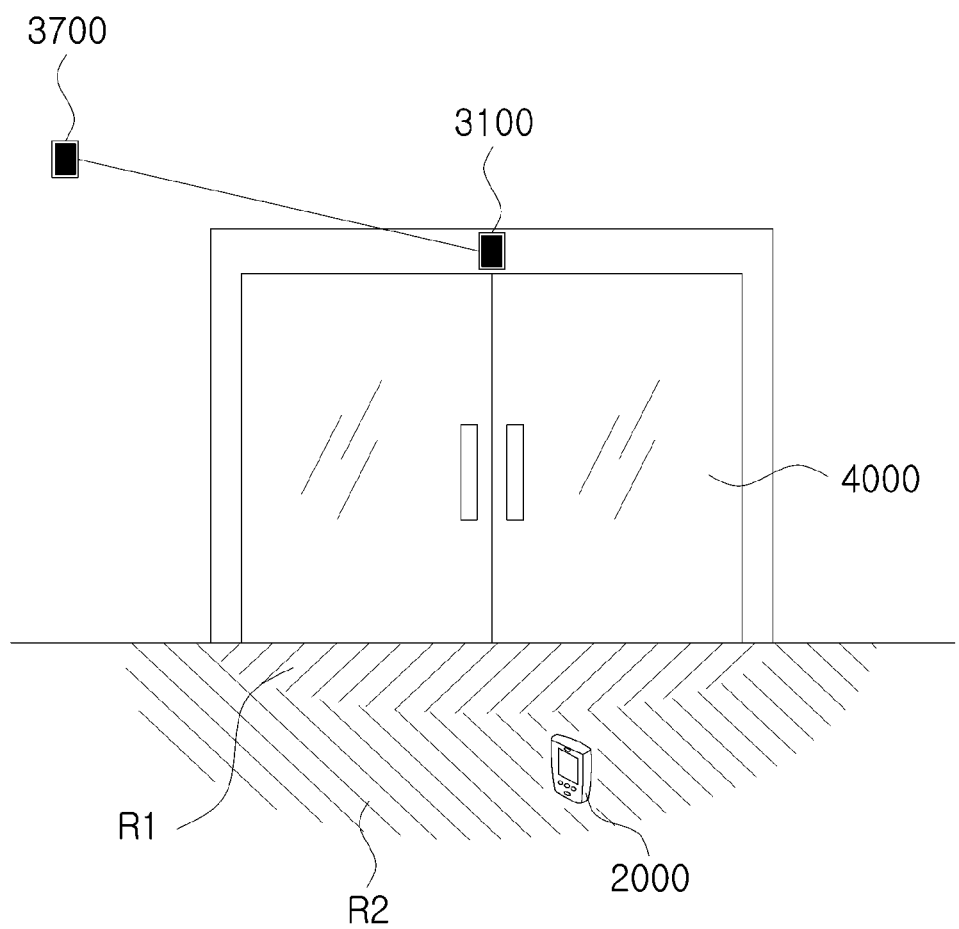
FIG. 21 is an example diagram showing operations of a door operating device according to an embodiment of the present invention in a general situation and a situation in which an exceptional event occurs.

FIG. 21 is an example diagram showing operations of a door operating device 3000 according to an embodiment of the present invention in a general situation and in a situation in which an exceptional event occurs.

As shown in FIG. 21, in a general situation, the door operating device 3000 may determine only a signal acquired in a first communication range as a normal signal. In detail, a door control unit 3700 may acquire a signal transmitted by a terminal 2000 through a door communication unit 3100. Also, when the signal acquired through the door communication unit 3100 is in the first communication range, the door control unit 3700 may determine the acquired signal as a normal signal. The door control unit 3700 may determine whether the acquired signal is in the first communication range on the basis of the strength of the signal. Also, when the signal acquired through the door communication unit 3100 is in a second communication range outside the first communication range, the door control unit 3700 may ignore the acquired signal.

Even though the acquired signal is in the second communication range, the door control unit 3700 may determine that acquired signal as a normal signal when an exceptional event has occurred.

When the signal occurs, the terminal 2000 may add an event occurrence notification that the exceptional event has occurred to the signal and then transmit the signal.

When the event occurrence notification indicating that the exceptional event has occurred is included in a signal acquired in the second communication range, the door control unit 3700 does not ignore the acquired signal, but may determine the signal as a normal signal.
Also, when the event occurrence notification that the special event has occurred is included in the acquired signal, the door control unit 3700 may perform a predetermined exceptional event operation. For example, the door control unit 3700 may perform an exceptional event operation for keeping a door open. As another example, the door control unit 3700 may perform an exceptional event operation for opening a door irrespective of conditions such as the presence of authority.

Also, according to some embodiments of the present invention, the authentication server 1000 may issue an authentication token, required by the terminal 2000 for the door operating device 3000, for registering a specified user so that only the specified user can be allowed to enter. The terminal 2000 may transmit the authentication token for registering the specified user to the door operating device 3000, and the door operating device 3000 may determine that only a specified user included in the authentication token has authority to open a door.

4.4. Region-Linked Security Method

A region-linked security method according to an embodiment of the present invention will be described below with reference to FIGS. 22 to 25.

Figure 22:
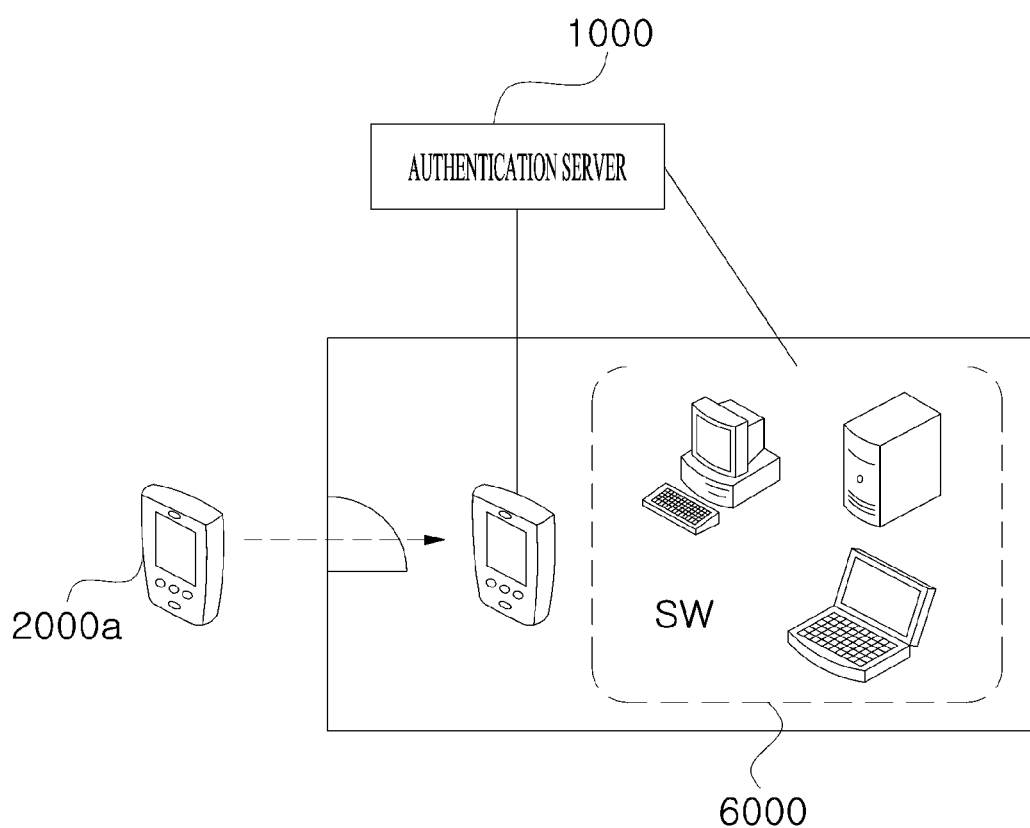
FIG. 22 is a surrounding view of a region-linked security method according to an embodiment of the present invention.

FIG. 22 is a surrounding view of the region-linked security method according to an embodiment of the present invention.

Referring to FIG. 22, the region-linked security method is an embodiment in which the use of an electronic device such as an office-specific electronic device 6000 and a hotel-specific electronic device, which is provided at a location accessible by a user, is allowed in consideration of at least one of the user's authorization and the user's access.

An office-specific electronic device 6000 provided in an office and an electronic device provided in a hotel room such as a lighting device and an air conditioner need to be limited so that the devices can be used by only a specified user.

However, when the user forgets a PC password or loses his or her hotel room key, an unauthorized user may use the office-specific electronic device or the hotel-specific electronic device.

Accordingly, the region-linked security method according to an embodiment of the present invention can enhance security by authentication server 1000 determining whether a user has actually entered a space where an electronic device is located and allowing the use of the electronic device only when the user has entered the space.

Figure 23:
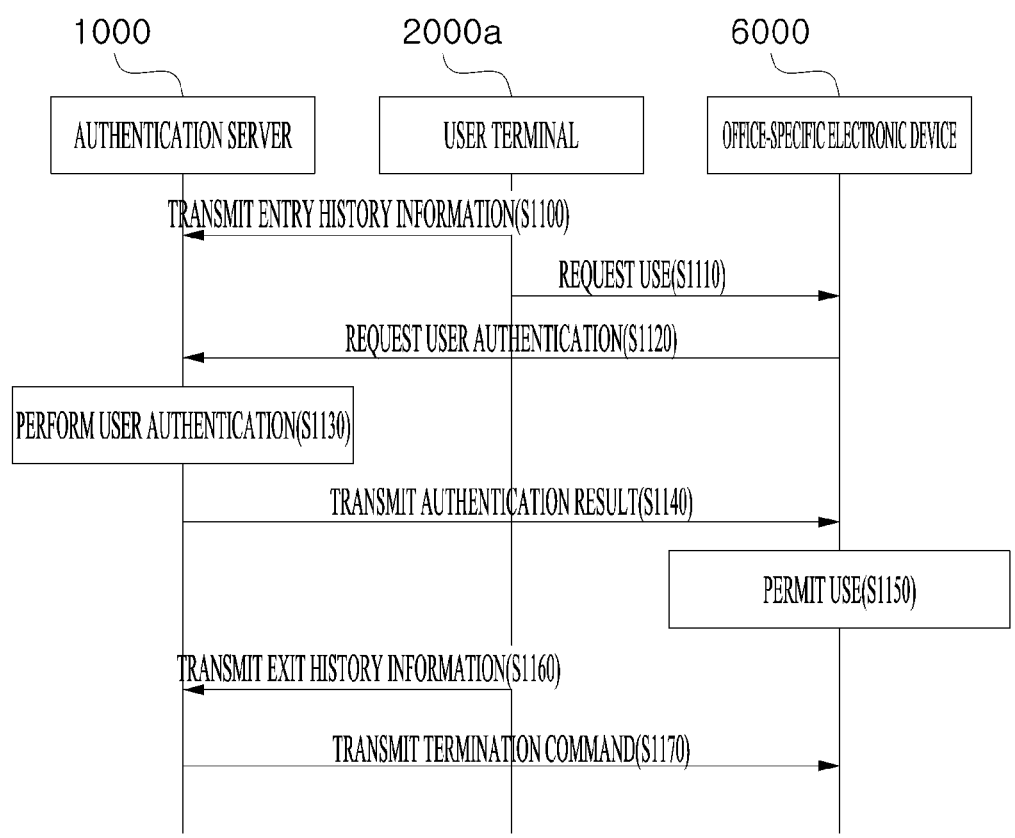
FIG. 23 is a sequence chart showing a region-linked security method according to an embodiment of the present invention.

FIG. 23 is a sequence chart showing the region-linked security method according to an embodiment of the present invention.

Referring to FIG. 23, the region-linked security method may include a user terminal 2000*a* transmitting entry history information to an authentication server 1000 (S1100), the user terminal 2000*a* requesting an office-specific electronic device 6000 to allow use of the office-specific electronic device 6000 (S1110), the office-specific electronic device 6000 requesting user authentication from the authentication server 1000 (S1120), the authentication server 1000 executing the user authentication (S1130), the authentication server 1000 transmitting a result of the authentication to the office-specific electronic device 6000 (S1140), permitting the use of the office-specific electronic device 6000 (S1150), the user terminal 2000*a* transmitting exit history information (S1160), and the authentication server 1000 transmitting a termination command to the office-specific electronic device 6000 (S1170).

According to some embodiments of the present invention, the transmission of entry history information to an authentication server 1000 may be performed by a user terminal 2000*a* (S1100). Here, the authentication server 1000 may be an authentication server 1000 that has issued an authentication token or a separate authentication server other than the authentication server 1000 that has issued the authentication token.

When permission information indicates that it has been determined that the user terminal 2000*a* has authority, the user terminal 2000*a* may transmit the permission information and door identification information regarding a permitted door.

The authentication server 1000 may acquire the permission information and the door identification information from the user terminal 2000*a* and may store the acquired permission information and door identification information.

The authentication server 1000 may determine a space the user has entered on the basis of the permission information and the door identification information.

Also, according to some embodiments of the present invention, the request for an office-specific electronic device 6000 to allow use of the office-specific electronic device 6000 may be performed by the user terminal 2000*a* (S1110).

The user terminal 2000*a* may transmit an authentication token to the office-specific electronic device 6000 to request use of the office-specific electronic device 6000. To this end, a communication means for communicating with the user terminal 2000*a* may be provided to the office-specific electronic device 6000.

Alternatively, the office-specific electronic device 6000 may acquire a use request input directly from a user, not via the user terminal 2000*a*. To this end, the office-specific electronic device 6000 may have an input means for acquiring a user input.

When the office-specific electronic device 6000 acquires a user request through the user input, the office-specific electronic device 6000 may acquire at least one of user information, user identification information, and a security key corresponding to user identification information through the user input.

Also, according to some embodiments of the present invention, the request of user authentication from the authentication server 1000 may be performed by the office-specific electronic device 6000 (S1120).

The office-specific electronic device 6000 may transmit the acquired authentication token to the authentication server 1000 to request user authentication.

The office-specific electronic device 6000 may determine whether authority for the office-specific electronic device 6000 is included in the acquired authentication token. When a result of the determination is that the authority for the office-specific electronic device 6000 is included, the office-specific electronic device 6000 may transmit the authentication token to the authentication server 1000 to request the user authentication. Also, when a result of the determination is that the authority for the office-specific electronic device 6000 is not included, the office-specific electronic device 6000 may output a rejection message for refusing the use.

Also, the office-specific electronic device 6000 may transmit at least one of the acquired user information, user identification information, and security key corresponding to user identification information to the authentication server 1000 to request the user authentication.

Also, according to some embodiments of the present invention, the execution of the user authentication may be performed by the authentication server 1000 (S1130).

The authentication server 1000 may determine whether a user corresponding to the authentication token acquired from the office-specific electronic device 6000 has passed through a door. The authentication server 1000 may determine whether the user corresponding to the authentication token has entered a space where the office-specific electronic device 6000 is located through a corresponding door 4000 on the basis of at least one of stored permission information, door identification information, and the access status information.

Also, the authentication server 1000 may determine authority corresponding to the user identification information acquired from the office-specific electronic device 6000.

Also, according to some embodiments of the present invention, the transmission of a result of the authentication to the office-specific electronic device 6000 may be performed by the authentication server 1000 (S1140).

When it is determined that the user corresponding to the authentication token has entered the space where the office-specific electronic device 6000 is located through the corresponding door, the authentication server 1000 may request the office-specific electronic device 6000 to allow use of the office-specific electronic device 6000.

The authentication server 1000 may transmit authentication information corresponding to the user identification information to the office-specific electronic device 6000 to request the office-specific electronic device 6000 to allow use of a function included in the authentication information.

When it is determined that the user corresponding to the user identification information has entered the space where the office-specific electronic device 6000 is located through the corresponding door, the authentication server 1000 may request the office-specific electronic device 6000 to permit the use.

Also, according to some embodiments of the present invention, the permission of the use on the basis of the authentication result may be performed by the office-specific electronic device 6000 (S1150).

The office-specific electronic device 6000 may permit the use of the office-specific electronic device 6000 when the user authentication result is permission.

Also, according to some embodiments of the present invention, the transmission of exit history information may be performed by the user terminal 2000*a* (S1160).

The authentication server 1000 may acquire from the user terminal 2000*a* information indicating that the user has passed through the door to exit the space where the office-specific electronic device 6000 is located.

Also, according to some embodiments of the present invention, the transmission of a termination command to the office-specific electronic device 6000 may be performed by the authentication server 1000 (S1170).

When the information indicating that the user has passed through the door to move from the space where the office-specific electronic device 6000 is located to the outside is acquired from the user terminal 2000*a*, the authentication server 1000 may request termination from the office-specific electronic device 6000. The termination of the office-specific electronic device 6000 may be at least one of a power-off operation, a screen saver operation, and a log-off operation.

4.4.1. Region-Linked Security Method—First Modification

The above-described region-linked security method may be variously modified depending on the use.

The first modification of the region-linked security method may be the authentication server 1000 acquiring door access information from the user terminal 2000*a* and transmits a control command to an external controller on the basis of the acquired door access information.

For convenience of description, an operation in a hotel room will be described below as an example. Conventionally, a physical key has been used to control access to the hotel room and control room functions of the hotel room. However, when such a physical key is used, it is inconvenient for the user to carry the physical key. Also, the user may want to activate hotel room functions when he or she is out of the hotel room. For example, even when the user leaves the hotel room, an air conditioner or a washing machine may need to operate. In this case, the physical key should be located inside the hotel room in order to activate the hotel room functions, and thus there is a problem in that the user cannot leave the hotel room. However, when the region-linked security method according to an embodiment of the present invention is applied to the operation in the hotel room, the above-described physical key may be replaced with a user terminal, and it is possible to solve such a problem caused by the use of the physical key. An embodiment in which the region-linked security method according to an embodiment of the present invention is applied to the operation in the hotel room will be described below in detail.

The first modification of the region-linked security method will be described below with reference to FIG. 24.

Figure 24:
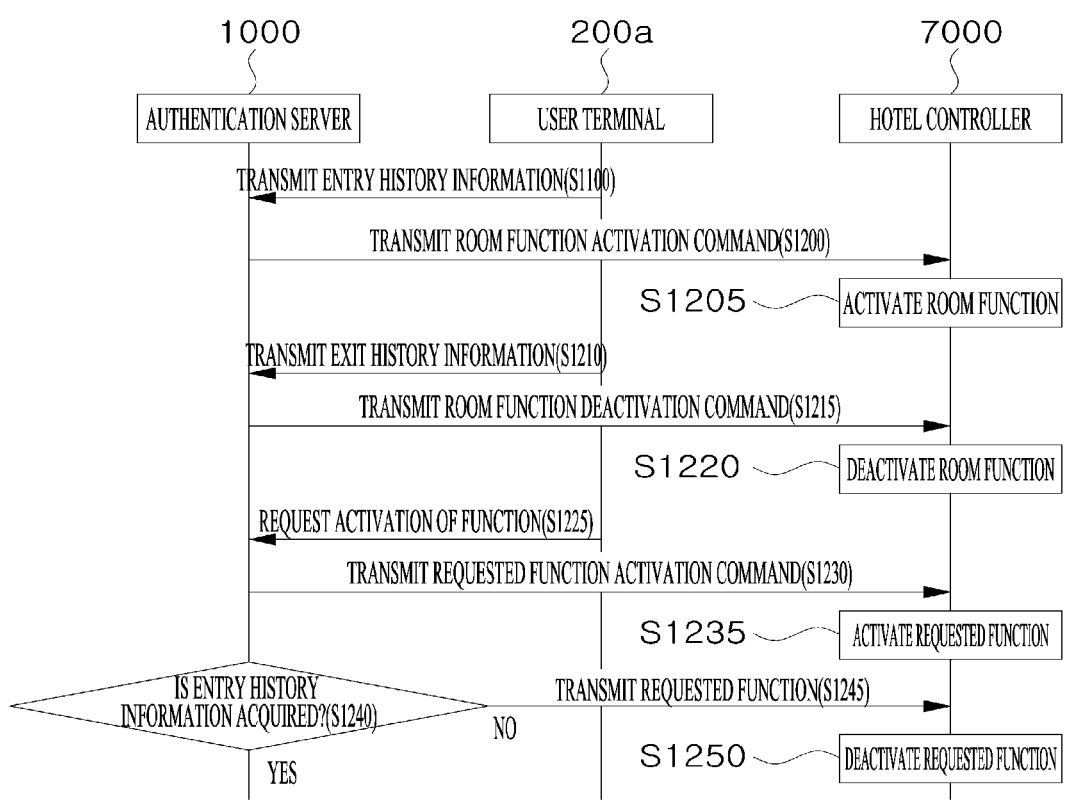
FIG. 24 is a sequence chart showing a first modification of the region-linked security method according to an embodiment of the present invention.

FIG. 24 is a sequence chart showing the first modification of the region-linked security method according to an embodiment of the present invention.

Referring to FIG. 24, while the first modification of the region-linked security method is described, operations between a user terminal and a door operating device 3000 may be performed according to any one of the first and second sub-embodiments, and thus a detailed description thereof will be omitted.

Referring to FIG. 24, the first modification of the region-linked security method may include a user terminal 2000a transmitting entry history information to an authentication server 1000 (S1100), the authentication server 1000 transmitting a room function activation command to a hotel controller 7000 (S1200), the hotel controller 7000 activating a room function (S1205), the user terminal 2000a transmitting exit history information to the authentication server 1000 (S1210), the authentication server 1000 transmitting a room function deactivation command to the hotel controller 7000 (S1215), the hotel controller deactivating the room function (S1220), requesting activation of the function by the user terminal 2000a (S1225), the authentication server 1000 transmitting a command to activate the requested function to the hotel controller 7000 (S1230), the hotel controller 7000 activating the requested function of the corresponding room (1235) the authentication server 1000 determining whether entry history information has been acquired within a predetermined amount time (S1240), the authentication server 1000 transmitting a command to deactivate the requested function (S1245), and the hotel controller 7000 transmitting a command to deactivate the requested function (S1250).

According to some embodiments of the present invention, the transmission of entry history information to an authentication server 1000 may be performed by a user terminal 2000a (S1100).

The entry history information may include at least one of information indicating that the door is permitted to open, door identification information of the permitted door, and access status information.

When permission information indicating that it is determined that the user terminal 2000a has authority to open the door is received from the door operating device 3000, the user terminal 2000a may transmit entry history information to the authentication server 1000.

The authentication server 1000 may acquire the entry history information from the user terminal 2000a and store the acquired entry history information.

Also, the authentication server 1000 may determine a current location of the user terminal 2000a on the basis of the entry history information and store the current location.

According to some embodiments of the present invention, the transmission of a room function activation command to a hotel controller 7000 may be performed by the authentication server 1000 (S1200).

The authentication server 1000 may transmit a control command to the hotel controller 7000 on the basis of the entry history information.

The authentication server 1000 may determine into which room the user has entered through the door 4000 on the basis of the entry history information acquired from the user terminal 2000a.

When it is determined that the user has entered the room, the authentication server may transmit a room function activation command to the hotel controller 7000 so that an operation of a specified electronic device among electronic devices in the room can be activated.

The activation and deactivation of the electronic device may be powering on and off the electronic device. Alternatively, the activation and deactivation of the electronic device may be supplying and shutting off power to the electronic device.

Depending on the embodiment, the room function activation command may be a command to supply power to a corresponding room, and the room function deactivation command may be a command to shut off power to a corresponding room. Also, exceptional electronic devices such as a refrigerator, to which power always has to be supplied, may be excluded from targets of the room function activation command and the room function deactivation command.

According to some embodiments of the present invention, the activation of a room function may be performed by the hotel controller 7000 (S1205).

The hotel controller 7000 may perform control so that an operation of an electronic device specified among electronic devices can be activated in a room in which it is determined that the user has entered on the basis of the room function activation command acquired from the authentication server 1000.

According to some embodiments of the present invention, the transmission of exit history information to the authentication server 1000 may be performed by the user terminal 2000a (S1210).

The authentication server 1000 may acquire exit history information indicating that the user has exited through the door from the user terminal 2000a.

The exit history information may include at least one of information indicating that the door is permitted to open, door identification information of the permitted door, and access status information.

Here, the entry history information and the exit history information may have different access status information.

When permission information indicating that it is determined that the user terminal 2000a has authority to open the door is received from the door operating device 3000, the user terminal 2000a may transmit the exit history information to the authentication server 1000.

The authentication server 1000 may acquire the exit history information from the user terminal 2000a and store the acquired exit history information.

Also, the authentication server 1000 may determine that the user terminal 2000*a* is out of the corresponding room on the basis of the exit history information and may store the determination.

According to some embodiments of the present invention, the transmission of a room function deactivation command to the hotel controller 7000 may be performed by the authentication server 1000 (S1215).

When it is determined that the user has exited the room, the authentication server 1000 may transmit a room function deactivation command to the hotel controller 7000 so that the device in the room can be deactivated.

According to some embodiments of the present invention, the deactivation of the room function may be performed by the hotel controller (S1220).

The hotel controller 7000 may perform control so that the function of the corresponding room can be deactivated on the basis of the room function deactivation command.

According to some embodiments of the present invention, the request for activation of the room function may be performed by the user terminal 2000*a* (S1225).

The authentication server 1000 may be requested by the user terminal 2000*a* to activate functions of at least some of the electronic devices included in the room from the user terminal.

For example, the authentication server 1000 may be requested by the user terminal 2000*a* to activate an air conditioner among the electronic devices included in the room.

The user terminal 2000*a* may output a graphic user interface (GUI) for receiving a function selected to be activated, outputting selectable functions or all functions, and receiving an approval for a function activation request from the user.

According to some embodiments of the present invention, the transmission of a command to activate the requested function to the hotel controller 7000 may be performed by the authentication server 1000 (S1230).

The authentication server 1000 may transmit a command to activate the requested function to the hotel controller 7000 on the basis of the function activation request acquired from the user terminal 2000*a*.

Also, the authentication server 1000 may determine whether the user has authority for the function included in the request. When it is determined that the user has authority for the function included in the request, the authentication server 1000 may transmit a command to activate the requested function to the hotel controller 7000.

Also, when it is determined that the user does not have authority for the function included in the request, the authentication server 1000 may transmit a rejection message to the user terminal 2000*a*.

According to some embodiments of the present invention, the activation of the requested room function may be performed by the hotel controller 7000 (S1235).

The hotel controller 7000 may activate an electronic device included in the room on the basis of the acquired requested function activation command. For example, when the request included in the requested function activation is to activate an air conditioner, the hotel controller 7000 may perform control so that the air conditioner can be activated. Also, when a sub-request such as a desired temperature is included in the requested function activation command, the hotel controller may perform control so that the sub-request can be performed. For example, when the sub-command includes an indoor temperature of 24 degrees, the hotel controller 7000 may control an air conditioner or a heater included in the room to maintain the indoor temperature of the room at 24 degrees.

According to some embodiments of the present invention, the determination of whether entry history information has been acquired may be performed by the authentication server 1000 (S1240).

For example, when the user terminal 2000*a* makes a request to turn on a lighting lamp in the room, the authentication server 1000 may transmit a control command to the hotel controller 7000 so that the lighting lamp is turned on even though the user is out of the room.

The authentication server 1000 may determine whether the entry history information is acquired after the function activation request is acquired.

In more detail, the authentication server 1000 may determine whether entry history information corresponding to a door installed in the room was acquired from the user terminal 2000*a* within a predetermined amount of time from a time at which the function activation request was acquired and from a time at which a command to activate the requested function was transmitted to the hotel controller 7000.

According to some embodiments of the present invention, the transmission of a command to deactivate the requested function may be performed by the authentication server 1000 (S1245).

When a result of determining whether the entry history information is acquired is that the entry history information corresponding to the door installed in the room was not acquired from the user terminal 2000*a* within the predetermined amount of time, the authentication server 1000 may transmit a command to deactivate the requested function to the hotel controller 7000. The command to deactivate the requested function may be a command to cancel the requested function activation command that has previously been transmitted to the hotel controller 7000 according to the request from the user terminal 2000*a*.

According to some embodiments of the present invention, the transmission of a command to deactivate the requested function may be performed by the hotel controller 7000 (S1250).

The hotel controller 7000 may perform control so that the function that has been activated in S1235 can be deactivated.

As another example, the hotel controller 7000 may cancel the command in S1235 on the basis of the command to deactivate the requested function.

4.4.2. Region-Linked Security Method—Second Modification

The second modification of the region-linked security method will be described below with reference to FIG. 25.

Figure 25:
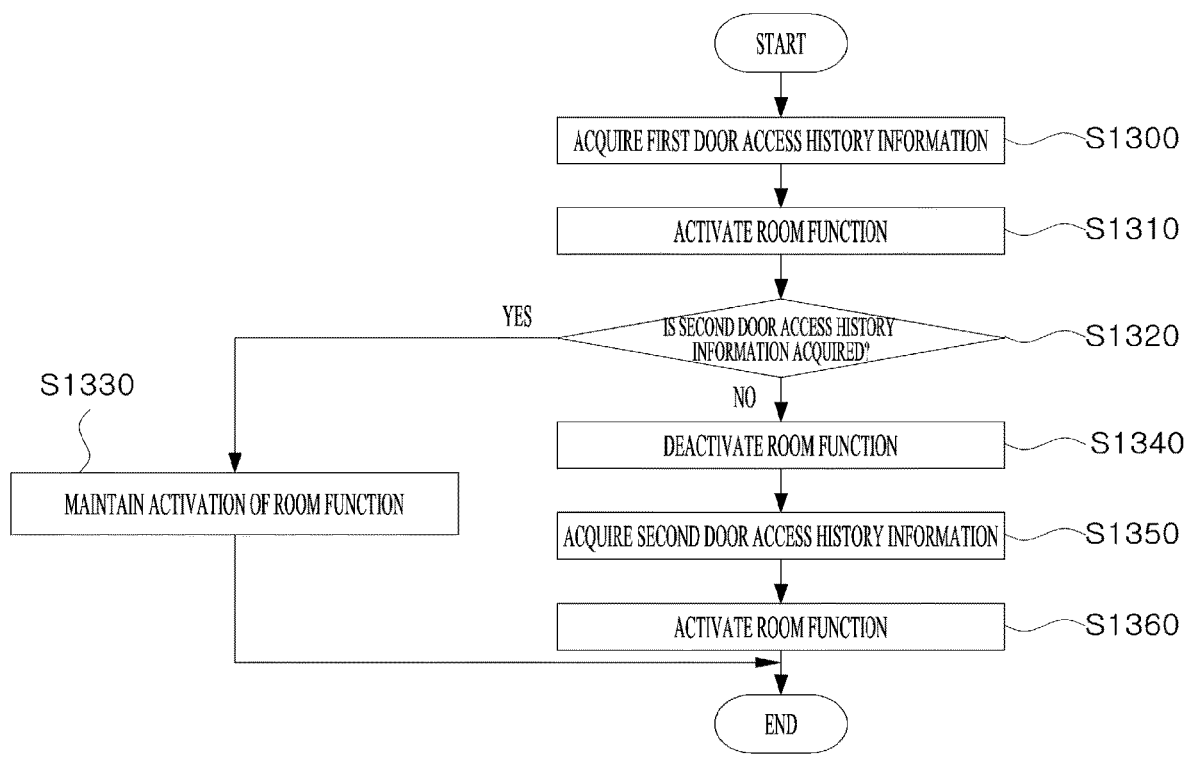
FIG. 25 is a flowchart showing a second modification of the region-linked security method according to an embodiment of the present invention.

FIG. 25 is a flowchart showing the second modification of the region-linked security method according to an embodiment of the present invention.

Referring to FIG. 25, the second modification of the region-linked security method may include acquiring first door access history information (S1300), activating a room function (S1310), determining whether second door access history information has been acquired (S1320), maintaining the activation of the room function (S1330), deactivating the room function (S1340), acquiring the second door access history information (S1350), and activating the room function (S1360).

According to some embodiments of the present invention, the acquisition of first door access history information may be performed (S1300).

When permission information indicating that it has been determined that the user terminal 2000*a* has authority to open a first door is received from the first door operating device 3000*a*, the user terminal 2000*a* may transmit the first door access history information to the authentication server 1000.

The first door may be a predetermined door other than a door of a room where the user stays. For example, the first door may be at least one door of a hotel lobby. As another example, the first door may be a door for entering a hallway for the room where the user stays.

The authentication server 1000 may acquire the first door access history information from the user terminal 2000*a* and store the acquired first door access history information.

Also, the authentication server 1000 may determine that the user of the user terminal 2000*a* has entered the first door on the basis of the entry history information and may store the determination.

Also, according to some embodiments of the present invention, the activation of a room function may be performed (S1310).

The authentication server 1000 may transmit a control command to the hotel controller 7000 on the basis of the first door access history information.

The authentication server 1000 may transmit a room function activation command to the hotel controller 7000 so that the user terminal 2000*a* can activate an operation of an electronic device specified among electronic devices in the room where the user stays on the basis of the first entry history information acquired from the user terminal 2000*a*.

The activation and deactivation of the electronic device may be powering on and off the electronic device. Alternatively, the activation and deactivation of the electronic device may be supplying and shutting off power to the electronic device.

Depending on the embodiment, the room function activation command may be a command to supply power to a corresponding room, and the room function deactivation command may be a command to shut off power to a corresponding room. Also, exceptional electronic devices such as a refrigerator, to which power always has to be supplied, may be excluded from targets of the room function activation command and the room function deactivation command.

Also, according to some embodiments of the present invention, the determination of whether second door access history information has been acquired may be performed (S1320).

The authentication server 1000 may determine whether the second door access history information regarding a second door provided at the room where the user stays has been acquired.

In more detail, the authentication server 1000 may determine whether the second door access history information has been acquired from the user terminal 2000*a* within a predetermined amount of time from a time at which the first door access history information was acquired or from a time at which the room function activation command was transmitted to the hotel controller 7000.

Also, according to some embodiments of the present invention, the maintenance of the activation of the room function may be performed (S1330).

When the second door access history information is acquired, the authentication server 1000 may maintain the activation of the room function. In more detail, the authentication server 1000 may maintain the activation of the room function when the second door access history information has been acquired from the user terminal 2000*a* within a predetermined time from a time at which the first door access history information was acquired or from a time at which the room function activation command was transmitted to the hotel controller 7000.

The maintenance of the activation of the room function may be not transmitting a cancellation command for the room function activation command or a room function deactivation command to the hotel controller 7000.

Also, according to some embodiments of the present invention, the deactivation of the room function may be performed (S1340).

When the second door access history information is not acquired, the authentication server 1000 may transmit the room function deactivation command to the hotel controller 7000 so that the room function can be deactivated. In more detail, the authentication server 1000 may transmit the room function deactivation command to the hotel controller 7000 when the second door access history information has not been acquired from the user terminal 2000*a* within the predetermined time from the time at which the first door access history information was acquired or from the time at which the room function activation command was transmitted to the hotel controller 7000.

Also, according to some embodiments of the present invention, the acquisition of the second door access history information may be performed (S1350).

When permission information indicating that it has been determined that the user terminal 2000*a* has authority to open a second door has been received from a second door operating device 3000*b*, the user terminal 2000*a* may transmit the second door access history information to the authentication server 1000.

The second door may be a door of the room where the user stays. For example, the second door may be an access door of the room where the user stays.

The authentication server 1000 may acquire the second door access history information from the user terminal 2000*a* and store the acquired second door access history information.

Also, the authentication server 1000 may determine that the user of the user terminal 2000*a* has entered the second door on the basis of the second door access history information and may store the determination.

Also, according to some embodiments of the present invention, the activation of the room function may be performed (S1340).

The authentication server 1000 may transmit a room function activation command to the hotel controller 7000 so that the user terminal 2000*a* can activate an operation of an electronic device specified among electronic devices in the room where the user stays on the basis of the second entry history information acquired from the user terminal 2000*a*.

Accordingly, the modification of the region-linked security method according to an embodiment of the present invention can prevent, even though a door key or a door card is lost, an unauthorized person from using electronic devices in a room because the electronic devices are not activated when it has not been confirmed that a user has entered the room. Also, the modification of the region-linked security method according to an embodiment of the present invention can increase a user's convenience by being able to request activation of some functions even while the user is out.

According to the present invention, it is possible to enhance a user's convenience by utilizing an authentication token to open an authorized door without the need for additional authentication while the authentication token is valid.

Also, according to the present invention, it is possible to enhance a user's convenience by opening an authorized door while the authentication token is valid even though an authentication server is disabled or communication between an authentication token and a door operating device is disconnected.

Also, according to the present invention, it is possible to manage authorized use of a user by considering access status information for entry or exit.

Also, according to the present invention, it is possible to quickly and accurately support evacuation of users by forcibly updating the authentication token when an exceptional event such as an emergency has occurred.

Also, according to the present invention, it is possible to strengthen security against use of an electronic device by an unauthorized intruder by permitting the use of the electronic device in consideration of whether there is an entry to a corresponding space.

Advantageous effects of the invention are not limited to the aforementioned effects, and other advantageous effects that are not described herein will be clearly understood by those skilled in the art from the following description and the accompanying drawings.

While the elements and features of the present invention have been described with reference to embodiments of the present invention, the present invention is not limited thereto. It will be obvious to those skilled in the art that various changes or modifications may be made therein without departing from the spirit and scope of the present invention. Accordingly, such changes or modifications are intended to fall within the scope of the appended claims.

What is claimed is:

1. An access control method performed by an access control unit, the access control method comprising:
    obtaining first information for a target device located in a target area;
    obtaining second information related to a user terminal for a user and a location information used for determining the location of the user terminal;
    determining whether the user has authority for using the target device based on the first information and the second information;
    determining the location of the user terminal as either inside the target area or outside the target area based on the location information; and
    transmitting a message for allowing the use of the target device to the target device when it is determined that the user has authority for using the target device and the location of the user terminal is inside the target area,
    wherein the first information includes an identifier of the target device,
    wherein the second information includes at least one of an identifier of the user, an identifier of the user terminal, or an identifier of a device corresponding to at least one of the identifier of the user or the identifier of the user terminal, and
    wherein the location information indicates that a first target door located in the target area for entering the target area is opened based on at least the second information.

2. The access control method of claim 1, wherein the first information further includes at least one of identifier of first user or identifier of first user terminal for the first user, and wherein the second information includes at least one of identifier of the user or identifier of the user terminal, and
    wherein the determining whether the user has authority for using the target device comprising determining that the user has authority for using the target device when the at least one of the identifier of the first user or the identifier of the first user terminal corresponds to the at least one of the identifier of the user or the identifier of the user terminal.

3. The access control method of claim 1, further comprising:
    transmitting a message for disallowing the use of the target device when it is determined that the location of the first user terminal is outside the target area or the user has not the authority for using the target device.

4. The access control method of claim 3, wherein the first target door is different than the second target door.

5. The access control method of claim 1,
    wherein the first information includes identifier of the target device,
    wherein the second information includes identifier of a device corresponding to at least one of identifier of the user or identifier of the user terminal, and
    wherein the determining whether the user has authority for using the target device comprising determining that the user has authority for using the target device when the identifier of the target device corresponds to the identifier of the device.

6. The access control method of claim 1, wherein obtaining second information comprises receiving the second information and the location information from the user terminal.

7. The access control method of claim 1, wherein the location information indicates that the first target door located in the target area for entering the target area is opened by a request from the user terminal when the user terminal is located in the outside of the target area.

8. The access control method of claim 1, wherein the determining the location of the user terminal comprises determining whether to open first target door located in the target area for entering the target area based on at least one of the second information or the location information.

9. The access control method of claim 8,
    wherein the second information includes an authentication information and an access status information, and
    wherein the determining whether to open the first target door comprises determining to open the first target door when the user has an authority for entering the first target door as a result of checking the authentication information and an access status for the first target door is valid as a result of checking the access status information.

10. The access control method of claim 1, wherein the second information and the location information are included in an authentication token.

11. The access control method of claim 1, wherein the location information indicates that second target door located in the target area for exiting the target area is opened by a request from the user terminal when the user terminal is located in the inside of the target area.

12. The access control method of claim 11, wherein the first target door and the second target door are same.

13. The access control method of claim 11, wherein the access control unit is included in a server, the target device, the user terminal or a door operating device to control opening at least one of the first target door or the second target door.

14. A non-transitory recording medium having a program recorded thereon for executing the method of claim 1.

15. An access control device, comprising:
a memory that stores instructions; and
at least one processor, upon executing the instructions, configured to:
obtain first information for a target device located in a target area;
obtain second information related to a user terminal for a user and a location information used for determining the location of the user terminal;
determine whether the user has authority for using the target device based on the first information and the second information;
determine the location of the user terminal as either inside the target area or outside the target area based on the location information; and
transmit a message for allowing the use of the target device to the target device when it is determined that the user has authority for using the target device and the location of the user terminal is inside the target area,
wherein the first information includes an identifier of the target device,
wherein the second information includes at least one of an identifier of the user, an identifier of the user terminal, or an identifier of a device corresponding to at least one of the identifier of the user or the identifier of the user terminal, and
wherein the location information indicates that a first target door located in the target area for entering the target area is opened based on at least the second information.

* * * * *